US012641393B2

(12) United States Patent
Davis et al.

(10) Patent No.: US 12,641,393 B2
(45) Date of Patent: May 26, 2026

(54) WEARABLE TECHNOLOGIES FOR DETECTING SPATIAL CONDITIONS AND GENERATING ALERTS

(71) Applicants: Susan Voeller Davis, Lisbon (PT);
Greg A. Voeller, Beaverton, OR (US)

(72) Inventors: Susan Voeller Davis, Lisbon (PT);
Greg A. Voeller, Beaverton, OR (US)

( * ) Notice: Subject to any disclaimer, the term of this patent is extended or adjusted under 35 U.S.C. 154(b) by 0 days.

(21) Appl. No.: 19/272,276

(22) Filed: Jul. 17, 2025

(65) Prior Publication Data

US 2026/0025636 A1      Jan. 22, 2026

Related U.S. Application Data

(60) Provisional application No. 63/672,414, filed on Jul. 17, 2024.

(51) Int. Cl.
*H04W 4/02*      (2018.01)
*G08B 7/06*      (2006.01)
*G08B 21/18*      (2006.01)

(52) U.S. Cl.
CPC .............. *H04W 4/023* (2013.01); *G08B 7/06* (2013.01); *G08B 21/182* (2013.01); *H04W 4/025* (2013.01)

(58) Field of Classification Search
CPC ........ H04W 4/023; H04W 4/025; G08B 7/06; G08B 21/182
USPC ...................................................... 455/456.3
See application file for complete search history.

(56) References Cited

U.S. PATENT DOCUMENTS

| | | | |
|---|---|---|---|
| 2010/0289646 A1* | 11/2010 | Raniere ................. | G08B 21/24 |
| | | | 340/568.1 |
| 2015/0234832 A1 | 8/2015 | Gardner, III et al. | |
| 2018/0241489 A1* | 8/2018 | Daoura ................... | H04L 67/10 |
| 2019/0146550 A1 | 5/2019 | Berardinelli | |
| 2021/0123288 A1 | 4/2021 | Cate et al. | |

OTHER PUBLICATIONS

The International Search Report and Written Opinion, dated Oct. 20, 2025, for the corresponding International Application No. PCT/US25/38065 in 10 pages.

* cited by examiner

*Primary Examiner* — Joel Ajayi
(74) *Attorney, Agent, or Firm* — Straylight LLP

(57) ABSTRACT

Disclosed are systems and techniques for proximity detection using a wearable sensing device. An example method can include obtaining sensing data based on one or more wireless signals, the sensing data comprising at least one of a proximity measurement and a distance measurement; determining, based on the sensing data, a spatial relationship between a device associated with a user and a source of the one or more wireless signals; determining whether the spatial relationship satisfies a proximity condition associated with a distance threshold; and based on a determination that the spatial relationship satisfies the proximity condition associated with the distance threshold, triggering a sensory alert via one or more output components.

20 Claims, 11 Drawing Sheets

440

400

420

440

404

Alert
Region

406

Alert
Region

Alert
Region

450

410

102

104

Wearable
Alert
System

Wearable
Alert
System

Wearable
Alert
System

No
Alert

445

430   Alert

430   Alert

Distance
Threshold
442A

Distance
Threshold
442B

Distance
Threshold
442C

700

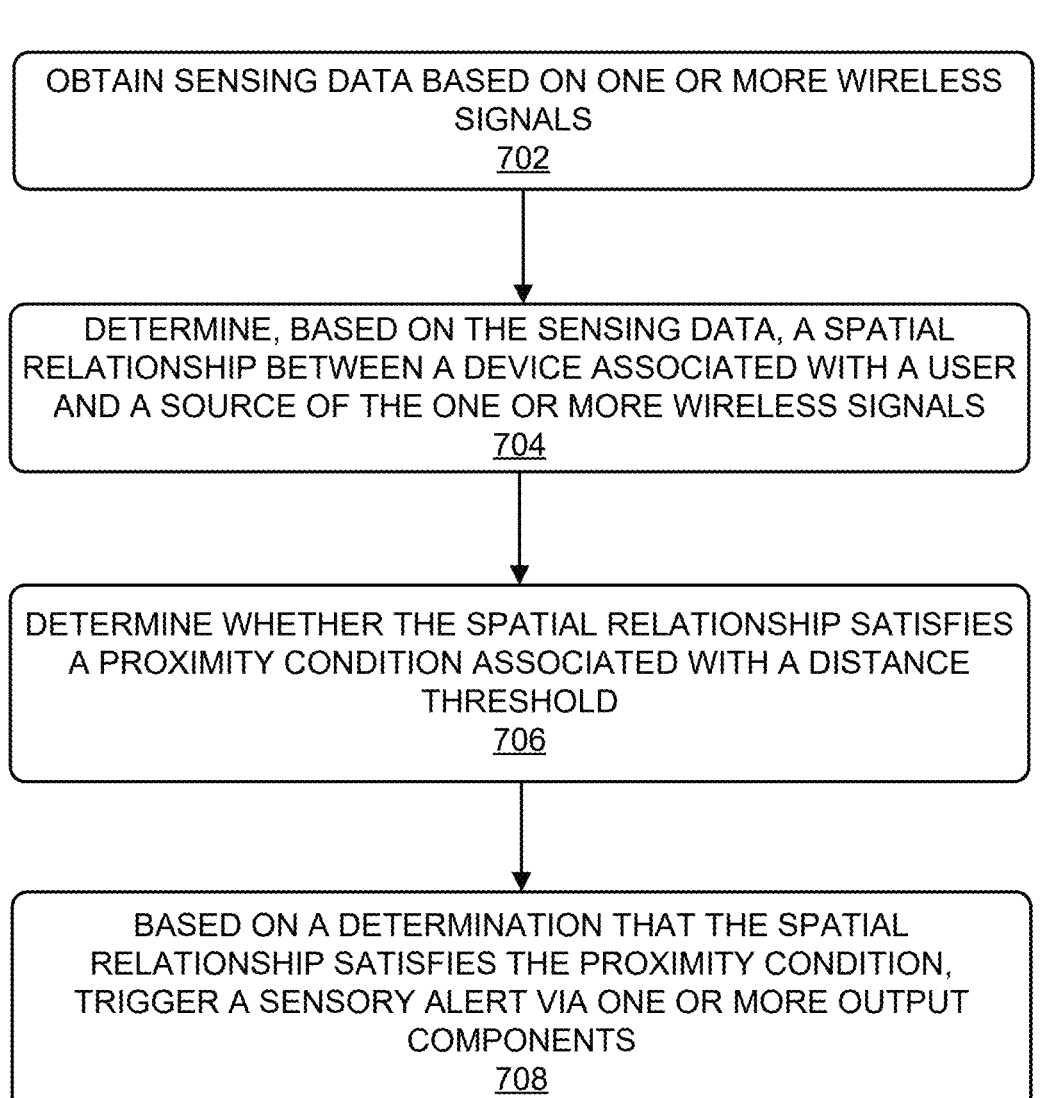

OBTAIN SENSING DATA BASED ON ONE OR MORE WIRELESS SIGNALS
702

DETERMINE, BASED ON THE SENSING DATA, A SPATIAL RELATIONSHIP BETWEEN A DEVICE ASSOCIATED WITH A USER AND A SOURCE OF THE ONE OR MORE WIRELESS SIGNALS
704

DETERMINE WHETHER THE SPATIAL RELATIONSHIP SATISFIES A PROXIMITY CONDITION ASSOCIATED WITH A DISTANCE THRESHOLD
706

BASED ON A DETERMINATION THAT THE SPATIAL RELATIONSHIP SATISFIES THE PROXIMITY CONDITION, TRIGGER A SENSORY ALERT VIA ONE OR MORE OUTPUT COMPONENTS
708

FIG. 7

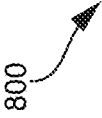
FIG. 8

WEARABLE TECHNOLOGIES FOR DETECTING SPATIAL CONDITIONS AND GENERATING ALERTS

CROSS-REFERENCE TO RELATED APPLICATIONS

This application claims the benefit of priority to U.S. Provisional Application No. 63/672,414 filed on Jul. 17, 2024, entitled "ELECTRONIC WEARABLE APPARATUS AND ASSOCIATED METHOD FOR DISTANCE DETECTION SPECIFICALLY BETWEEN SAME TYPE APPARATUSES THAT ARE TAGGED (TARGETED) TO EACH OTHER", the contents of which are hereby incorporated by referenced in its entirety and for all purposes.

TECHNICAL FIELD

The present disclosure generally relates to proximity sensing. For example, aspects of the present disclosure relate to wearable alert systems used to detect a presence of nearby users, devices, or objects using wireless sensing.

BACKGROUND

Electronic systems and devices can implement a range of communication technologies and sensing modalities to support applications such as geolocation, route mapping, asset tracking, and fitness monitoring, among others. The electronic systems and devices may be equipped with wireless transceivers, sensors, or other modules used to communicate or implement sensing capabilities. Various sensing systems are increasingly used by electronic systems and devices for applications such as automation, interactive gaming, and safety operations. However, the sensing systems generally rely on centralized infrastructure, high-power radios, or mobile phones to function, which may limit or reduce their accessibility, flexibility, or use, particularly in fast-paced or high-risk use cases and environments.

BRIEF DESCRIPTION OF THE DRAWINGS

Illustrative embodiments and examples of the present application are described in detail below with reference to the following figures:

FIG. 5B is another example implementation of a wearable alert system worn by two users, according to some examples of the present disclosure;

FIG. 5C is an example implementation of a wearable alert system worn by a user, according to some examples of the present disclosure;

FIG. 7 is a flow diagram illustrating an example process for proximity detection using wireless sensing, according to some examples of the present disclosure;

FIG. 8 is a diagram illustrating an example architecture of an example neural network, according to some examples of the present disclosure.

DETAILED DESCRIPTION

Figure 1:
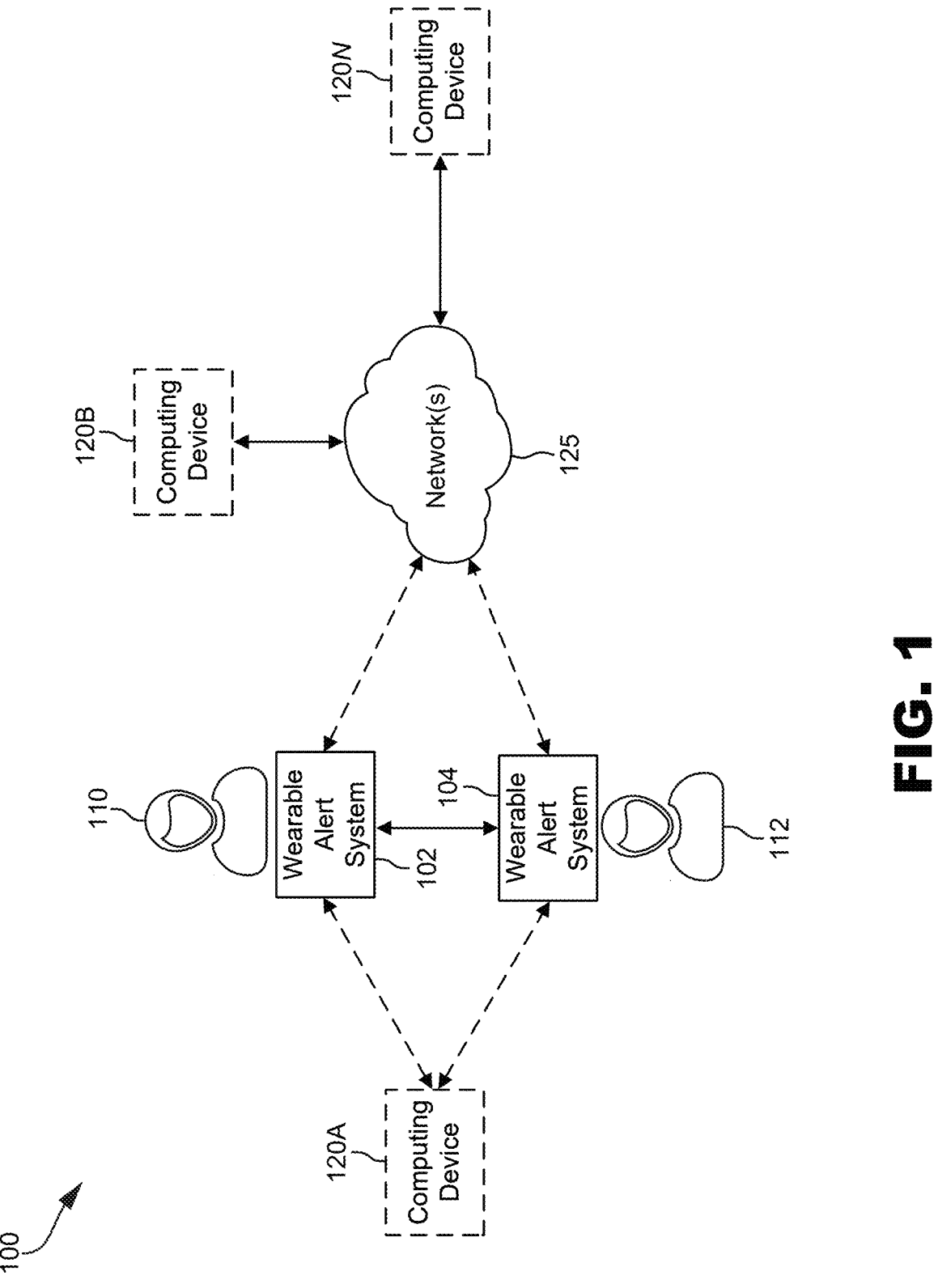
FIG. 1 illustrates an example of a wireless communication system, according to some examples of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description will provide those skilled in the art with an enabling description for implementing an example embodiment. It should be understood that various changes may be made in the function and arrangement of elements without departing from the scope of the application as set forth in the appended claims.

Electronic devices can implement communication and sensor-based services such as geolocation, spatial mapping, presence detection, proximity sensing, obstacle avoidance, route-finding, and location-based services, among others. The electronic devices may include, but are not limited to, mobile phones, wearable devices (e.g., smart watches, fitness or activity trackers, etc.), smart devices (e.g., smart speakers, light bulbs, displays, etc.), connected vehicles (e.g., automobiles, drones, etc.), game systems, Internet-of-Things (IoT) devices, digital cameras, augmented reality (AR) and/or virtual reality (VR) devices, tablet computers, laptop computers, robotic systems, and medical or assistive devices, among others. To enable communication and/or sensor-based functionalities, electronic devices may incorporate specialized hardware and software components. In many cases, such components may be configured to transmit and receive wireless signals, such as radio frequency (RF) signals, Wi-Fi signals, infrared signals, and/or other wireless signals. Moreover, the electronic devices may use certain protocols to communicate and/or perform sensing functions such as sensor protocols, communication protocols, etc. For example, the electronic devices may use wireless communication protocols such as, for example and without limitation, Wi-Fi, Bluetooth™, Bluetooth Low Energy (BLE), ZigBee®, Z-Wave, Near Field Communication (NFC), Cellular 5G (New Radio, NR), LTE, and ultra-wideband (UWB), among others.

The various sensing and/or communication protocols and technologies may have different advantages and characteristics, such as a lower power consumption footprint or higher sensing accuracy, and/or may be more suitable for certain applications. Accordingly, the sensor technologies used by electronic devices for a given use case(s) may depend on a number of factors such as, for example, specific operational ranges, sensor precisions, power efficiencies, environmental compatibilities, form factor constraints, costs, device ruggedness or durability characteristics, regulatory constraints or requirements, sensor resolutions, signal penetration attributes or requirements, etc.

For example, certain distance or presence-sensing technologies may provide more accurate distance or presence detection measurements, higher spatial resolution, lower latency response times, higher resistance to multipath interference, more reliable operations in complex sensing or wireless environments (and/or any other environments), etc. To illustrate, UWB can differentiate between direct and reflected signal paths, and allow accurate determination of distances in the presence of physical obstacles and even in cluttered environments. Accordingly, UWB can be used by electronic devices for distance or presence-sensing applications. Non-limiting examples of other sensors and sensing technologies that can additionally or alternatively be used for distance or presence-sensing applications include infrared sensors, magnetic-field sensors, ultrasonic sensors, narrowband RF sensors, time-of-flight (ToF) sensors, radio detection and ranging (RADAR) sensors, optical sensors, light detection and ranging (LIDAR) sensors, and image/camera sensors, among others.

In some cases, the electronic devices may alternatively or additionally implement other sensors and sensing technologies for use in distance or presence-sensing applications, other sensing applications, or any combination of sensing applications. Non-limiting examples of other sensors and sensing technologies that can be used by the electronic devices can include accelerometers, gyroscopes, weight sensors, stress sensors, ambient light sensors, microphones, motion sensors, impact sensors, biometric sensors, inertial measurement units (e.g., with or without also implementing separate accelerometers and/or gyroscopes), environmental sensors, object detection sensors, and/or any other sensors.

The systems, apparatuses, processes (also referred to as methods), and computer-readable media (collectively referred to as "systems and techniques") described herein can include and/or provide electronic devices used to sense information and/or conditions in an environment. The sensed information and/or conditions can be used to drive an operation, a behavior, a function, a setting(s), and/or any other feature(s) of the electronic devices, as further described herein. In some examples, the electronic devices can include wearable electronic devices or any other devices, as further described herein. The electronic devices are also referred to herein as wearable electronic devices, devices, tagged devices, or static devices. The wearable electronic devices can provide various capabilities, uses, behaviors, applications, and/or functions as further described herein, such as sensing capabilities, alert/notification capabilities, teaching capabilities, safety capabilities, interactive capabilities, recognition capabilities, etc.

The wearable electronic devices (and/or any other devices described herein) can implement sensors used to detect the presence of obstacles (e.g., objects, users, devices, structures, trees, etc.) relative to the wearable electronic devices (and/or users associated with the wearable electronic devices), expand the perception zone of the wearable electronic devices and/or associated users, sense and/or predict collisions, track and/or localize users and/or objects, detect activity relative to the wearable electronic devices and/or associated users, implement assistive technologies, guide user activity, and/or use sensing capabilities to train users for certain activities and/or scenarios, among others. In some examples, the wearable electronic devices can use sensing technologies to help users and/or objects avoid collisions, generate safety alerts for users and/or devices, and/or help guide user activity and/or behavior.

For example, a wearable electronic device can use one or more sensing technologies described herein to alert a user wearing the wearable electronic device of a potential collision (e.g., a potential collision with an object, another user, an animal, a structure, etc.), help the user avoid a potential collision, guide a movement and/or position of the user during an activity, train the user in a sport (e.g., by guiding a movement and/or position of the user), expand a perception zone and/or spatial awareness of the user, help the user pay attention and/or react to certain cues such as collision or spatial-awareness cues, track and/or predict a motion of the user, alert the user of potential danger events such as presence or distance-related events, etc.

The wearable electronic devices can use vision-based and/or non-vision-based detection and/or spatial awareness technologies to perform sensing operations such as presence and/or proximity sensing. In some examples, the wearable electronic devices may leverage wireless signals to provide robust, real-time, low-latency spatial detection and awareness. The sensing technologies implemented by the wearable electronic devices can depend on respective constraints, conditions, use cases, and/or other factors, as previously explained. For example, vision-based systems, such as cameras or LIDAR sensor sensors, may use ambient lighting, line-of-sight/visibility, and computational and power (e.g., battery, compute, etc.) resources for image processing operations used for presence detection and/or spatial awareness. Such vision-based systems may achieve detection results with certain accuracies but use more power and computational resources than other sensing technologies. On the other hand, non-vision based sensor technologies such as sensor technologies that relay on wireless signals (e.g., RF signals such as UWB RF signals, etc.) to detect the presence and relative positioning of nearby users, objects, and/or devices may use less power and/or computational resources and may generate presence/positioning measurements independent of ambient lighting conditions, orientation, or visual obstructions.

In some instances, a wearable electronic device may detect a spatial relationship (e.g., a proximity, presence, distance, relative trajectory, etc.) of the wearable electronic device and another device, such as an electronic device or another wearable electronic device. For example, the wearable electronic device can detect a relative presence, proximity, and/or distance of another electronic device based on a determination that the wearable electronic device received or detected a signal from the other device, a determination that a detected signal is from the other device, and/or a characteristic (e.g., a strength, etc.) of a signal from the other device. In some examples, the wearable electronic device may detect a proximity or presence of a target(s) such as an object, a structure, an animal, a person, and/or any obstacle. The wearable electronic device may detect a proximity or presence of such a target(s) with or without leveraging another electronic device or signals from another electronic device, such as a tagged device.

As further described herein, the wearable electronic device may detect a spatial relationship (e.g., proximity, presence, distance, relative trajectory, etc.) of the wearable electronic device and a the target(s) based on one or more wireless signals (e.g., UWB RF signals, Bluetooth signals, WIFI signals, near-field communication signals, cellular signals, infrared signals, etc.) and/or sensor data measuring a spatial information pertaining to the target(s) relative to a location/position and/or trajectory of the wearable electronic device. The sensor data can include data from a proximity, presence, or distance sensor(s) such as, for example and without limitation, an image sensor (e.g., a camera sensor), a time-of-flight sensor, a RADAR sensor, a LIDAR sensor, an infrared sensor, an ultrasound or ultrasonic sensor, a narrowband RF sensor, a capacitive proximity sensor, a gyroscope, an accelerometer, a magnetometer, and/or any other proximity, distance, presence, and/or motion sensor. In some examples, the wearable electronic device can detect a presence, distance, and/or proximity of the target(s) and/or another electronic device(s) based on data from an anchorless UWB proximity sensor. The UWB proximity sensor can include a system that uses UWB technology for localization and proximity detection without relying on fixed infrastructure (e.g., anchors). Instead of using anchors placed at known locations to triangulate a target's position (e.g., a tagged device, a tagged object, an obstacle, etc.), the anchorless UWB sensor can rely on a single device or a network of devices to determine a relative position or proximity of a target(s), such as an object, an electronic device, an obstacle, etc.

The wearable electronic device can to provide feedback to a user based on a presence, proximity, and/or distance detection result that satisfies a threshold (e.g., an alert triggering presence, proximity, and/or distance value; a threshold condition such as threshold relative positions and trajectories; etc.). The wearable electronic device can provide feedback via visual outputs, audio outputs, haptic outputs, and/or any other outputs. Visual outputs can be generated by a visual output component such as a light emitting device (e.g., a lamp, a light-emitting diode (LED), etc.), a visual display (e.g., an LED display, an e-ink display, etc.), and/or any other visual output component. The audio outputs can be generated by an audio output component such as a speaker device(s).

The haptic outputs can be generated by a haptic output component(s) such as, for example, a vibration motor, piezoelectric actuator, linear resonant actuator (LRA), and/or other tactile stimulation device or mechanism. In some cases, the wearable electronic device may dynamically and/or programmatically adjust a strength, frequency, and/or pattern of the haptic feedback based on one or more factors such as, for example, a measured proximity, rate of approach, directionality of a particular target (e.g., a device, object, user, structure, etc.). For instance, a steady pulse (e.g., a pulse implementing a particular pattern such as a fixed pattern, a pattern with a threshold stability, a pattern with a less than a threshold amount or range of variability, etc.) may indicate a specific condition, such as an object within a range, while a different pulse such as a rapid pulse (e.g., a pulse with a certain frequency) or escalating pulse may signal a different condition, such as an imminent contact with an object.

The haptic feedback may provide a discreet, private, and/or intuitive strategy for alerting users to spatial or presence conditions, proximity thresholds, motion parameters, etc., without relying on visual displays or auditory alerts, which may or may not be implemented instead of or in addition to the haptic feedback. Accordingly, the haptic feedback may be beneficial in scenarios where visual and/or auditory attention is limited or unavailable (e.g., certain athletic training scenarios, assistive navigation for visually or hearing-impaired individuals, assistive technologies for individuals in environments with certain noise and/or ambient light conditions, physical rehabilitation exercises, collaborative team-based activities, safety monitoring environments, military or tactical operations, emergency evacuation, navigation in visually obstructed or low-visibility settings, etc.).

In some examples, a wearable electronic device may implement a proximity sensing device(s) that integrates motion-sensing data derived from one or more motion sensors and/or sensing technologies, such as an inertial measurement unit (IMU), an accelerometer (in addition to or instead of an IMU), a gyroscope (in addition to or instead of an IMU), a magnetometer (in addition to or instead of an IMU), etc., to determine and interpret user motion states. The one or more motion sensors and/or sensing technologies (and/or any other sensors and/or sensing technologies) may be embedded in the wearable electronic device itself, physically and/or communicatively coupled to the wearable electronic device, or interfaced through modular sensor hubs. By way of example, IMU sensors can accurately detect specific user motions and activities, such as standing, walking, jogging, sprinting, cycling, jumping, crouching, rotational movements, acceleration, deceleration, and/or directional changes. In some aspects, any of such motion states may influence a device behavior. For example, a proximity sensing device (e.g., a proximity sensor of a wearable electronic device) may dynamically adjust proximity detection thresholds, alert types, alert timings, polling intervals, and/or sampling rates of sensing signals based on sensor inputs or outputs. To illustrate, a proximity threshold implemented by a proximity sensor of a wearable electronic device may increase when the proximity sensor detects running (e.g., motion indicating that a user wearing the wearable electronic device or a nearby user is running) or aggressive lateral movement (e.g., lateral movement above a threshold) by or relative to a user wearing the wearable electronic device, reflecting reduced reaction times, while decreasing when the user is stationary or performing lower-speed maneuvers, in order to minimize false or unnecessary alerts.

The strength/magnitude and/or frequency of the haptic feedback may additionally or alternatively vary based on a movement context. For example, the strength/magnitude and/or frequency of the haptic feedback may increase when a detected motion is rapid (e.g., above a threshold) or erratic (e.g., satisfying one or more thresholds used to define erratic movement) to provide more urgent alerts (and/or alerts indicating a higher urgency) when motion is rapid or erratic.

The haptic feedback may also depend on other thresholds as further described herein, such as sensitivity, probability, contextual, motion, trigger, event, and/or other thresholds.

In some cases, the wearable electronic devices and/or associated users may adjust thresholds, feedback profiles, behavioral modes, and/or operating parameters. For example, users may manually configure, change, and/or fine-tune thresholds (e.g., sensitivity thresholds), feedback profiles, behavioral modes, and/or operating parameters through user interfaces provided on or coupled to the wearable electronic devices. The user interfaces can include visual input interfaces and/or other input devices such as mechanical components (e.g., physical toggles, push-buttons, rotary dials, switches, etc.) that allow adjustment without visual input or confirmation. In some examples, the wearable electronic devices may incorporate capacitive touch surfaces, LED-based visual indicators, vibration-based user interface (UI) confirmations, graphical user interfaces displayed on displays such as embedded or coupled light-emitting diode (LED) displays, organic LED (OLED) displays, e-ink displays, touch screens, etc. In some aspects, a wearable electronic device may be configured via an application of the wearable electronic device and/or a wireless companion application on a separate device, such as a mobile phone or tablet/laptop computer, offering customization options such as parameters, user profiles, training modes, adaptive presets, rules, and/or values for specific activities, user preferences, scenarios/contexts, use cases, etc. For example, a coach of a youth soccer team may configure/preconfigure and/or adjust settings for specific youth soccer drills (or youth soccer drills in general). As another example, a visually impaired user may select a vibration profile optimized for indoor navigation.

In some examples, wearable electronic devices may be preconfigured, paired, or selectively tagged to communicate with certain devices or types of devices. This may help the wearable electronic devices to reduce interference and/or irrelevant/noise signals from other devices, such as irrelevant proximity detection signals from other devices. In some cases, device identifiers may be embedded (e.g., during manufacturing) on the wearable electronic devices or provisioned on the wearable electronic devices through or during an onboarding or registration process. The identifiers may be used (e.g., with or without other data) by a filtering algorithm to accept or ignore signals from specific devices, device groups, categories, or communication profiles. In some aspects, pairing constraints may be defined using group identifiers, broadcast identifiers, encryption keys, whitelist or blacklist data, device signatures, pairing data, and/or authentication-based communication handshakes. In some cases, the paring constraints may be used in group-oriented scenarios. For example, during athletic training exercises (e.g., soccer, football, lacrosse, etc.), wearable electronic devices may be configured to interact with or exclusively with other devices worn by teammates, coaches, and/or designated training targets while ignoring signals from other or unrelated players or coaches, nearby spectators, environmental noise sources, etc.

In some instances, a digital interface may allow users, such as coaches or administrators, to assign group/device tags or dynamically reconfigure device pairing relationships before and/or during training. For example, a training mode may restrict communication to certain players or devices, such as devices of players in a particular squad or group performing a drill. In another example, in industrial, construction, or warehouse safety settings, wearable electronic devices may be programmed to detect and respond specifically to tagged equipment, power tools, hazardous material containers, other workers, stationary environmental markers such as emergency exits, low-clearance beams, restricted access areas, etc. Such context-aware pairings may allow devices to generate alerts only when relevant interactions or conditions are detected, which may reduce false positives and improve the signal-to-noise ratio of alert behaviors.

In some examples, the electronic devices with spatial awareness capabilities (e.g., proximity, presence, distance, trajectory, and/or other spatial detection capabilities) described herein may be affixed or attached to stationary reference points such as, for example and without limitation, walls, boundary markers, safety barriers, ceiling-mounted installations, shelving units, objects, machinery, structures, etc. In some cases, the devices in such scenarios may operate in a transmit mode where the devices transmit or broadcast signals to be received/detected by other devices. The signals may be continuous or emitted at configurable intervals. In some cases, wearable electronic devices carried or worn by users approaching the electronic devices on stationary reference points may receive and analyze the emitted signals to determine if a proximity threshold has been satisfied or exceeded. In some instances, the signal from the stationary device may include metadata indicating the nature of an obstacle (e.g., "wall," "exit," "forklift zone", etc.) or alert level, which may be used by the receiving device to adjust the type or urgency of an alert generated by such device. For example, a stationary proximity device or beacon mounted on a baseball outfield wall may continuously transmit a short-range UWB signal. When a player wearing a wearable electronic device approaches the wall (e.g., while chasing a fly ball), the wearable electronic device worn by the player may detect a signal(s) from the stationary proximity device or beacon and provide one or more alerts. In some cases, the wearable electronic device worn by the player may provide escalating alerts, such as vibration pulses escalating in frequency and/or strength/magnitude, as the player nears the wall to alert the player that the player is moving closer to the wall and thus closer to colliding with the wall, so the player can react accordingly to prevent a collision with the wall. In another example, a worker navigating a warehouse floor may wear a wearable electronic device that detects signals from forklifts, pallet jacks, or overhead crane systems, and issues alerts based on configured distance thresholds and motion vectors of the tagged equipment.

In some instances, the wearable electronic devices (and any other paired devices) may operate independently of external communication networks, cloud-based computational infrastructure, fixed infrastructure, or centralized servers. The electronic devices described herein may locally perform all or a portion of the sensing, processing, and feedback operations (e.g., including signal emission and reception, signal strength analysis, proximity threshold evaluation, decision logic execution, alert generation, etc.) using hardware, software, and firmware, such as embedded hardware, software logic, and firmware. In some cases, such self-contained architecture may enable faster response times (e.g., real-time responsiveness) while minimizing latency and dependency on external systems, such that functions may be maintained even in offline, remote, or infrastructure-limited environments such as sports fields, industrial zones, natural disaster areas, underground facilities, offshore scenarios, etc. In some cases, the processing capabilities, alert logic, sensing capabilities (e.g., detection/recognition capabilities, sensor data interpretation, etc.) described herein may be implemented entirely in software and/or firmware, which may enable deployment of the systems and techniques described herein in third-party platforms such as third-party smart glasses, earbuds, head-mounted displays (HMDs), etc., via licensing models, and may not use or need dedicated hardware modifications. In some cases, the wearable electronic devices can determine spatial information with respect to a target(s) without relying on another device (s) or anchor (e.g., stationary/fixed or non-stationary object, structure, device, etc.). For example, instead of using signals from other devices or anchors placed at specific locations to determine (and/or triangulate) a relative position of the wearable electronic device and a target(s), the wearable electronic device can use wireless signals and/or sensor signals from one or more components of the wearable electronic device, such as an RF transceiver(s), an image sensor(s), a TOF sensor(s), an infrared sensor(s), a RADAR sensor, a LIDAR sensor, an ultrasound or ultrasonic sensor (s), a gyroscope(s), an accelerometer(s), a magnetometer(s), an antenna(s), etc.

The electronic devices described herein may implement one or more processing devices used to process sensor data, generate alerts, implement logic, etc. In some examples, the electronic devices may incorporate one or more microcontrollers or processors dedicated to specific subsystems (e.g., communication interface, motion sensing, signal processing, alert actuation, etc.), which may optimize energy distribution across components. Localized signal processing may include filtering, interpolation, signal averaging, outlier rejection, motion-informed damping, etc., to improve robustness in noisy environments or fluctuating signal conditions. In some instances, to extend battery life and optimize power efficiency, power management strategies may be employed. In some configurations, the devices may dynamically modulate polling intervals or sampling rates based on detected motion states, user activity patterns, environmental context, and/or other factors and/or cues. For instance, during periods of sustained motion, the devices may maintain a higher polling frequency to ensure faster or real-time responsiveness, while transitioning to reduced polling or sleep modes during periods of inactivity (e.g., periods with less than a threshold amount of activity, threshold periods of inactivity, etc.).

In some aspects, haptic output intensity may be adaptively scaled based on proximity urgency, motion velocity, or user preferences, which may reduce energy expenditure without compromising situational awareness. For example, the devices may enter a lower-power or idle state after a predefined duration of inactivity or may initiate automatic shutdown after threshold periods without detecting a signal from a tagged device or a motion event. In some cases, wake-up conditions may include user interaction (e.g., touch or movement), scheduled polling timers, proximity signal detection events, and/or any other trigger. Moreover, the devices may optionally support energy harvesting mechanisms that extract usable power from environmental sources to extend operational lifespan or reduce the frequency of user-initiated recharging. Examples of energy harvesting technologies may include, but are not limited to, photovoltaic cells configured to convert ambient light into electrical power (e.g., suitable for outdoor athletic or industrial use), thermoelectric generators leveraging temperature gradients between device surfaces and the environment (e.g., worn on the skin), piezoelectric elements that produce voltage under mechanical deformation (e.g., during walking or impact), and kinetic or electrodynamic harvesters that convert body movement into chargeable current. In some aspects, ambient RF energy harvesting modules may collect stray electromagnetic radiation from local signal sources, such as Wi-Fi, cellular, or Ultra High-Frequency (UHF) sources, and convert such radiation into usable trickle charge for battery supplementation. These energy harvesting techniques, with or without being combined with power management protocols and energy-aware device software and/or hardware, may extend operational lifetimes of devices, including wearable electronic devices or fixed transmit-only beacon devices installed in hard-to-access areas. In some cases, the device may operate continuously or indefinitely without manual charging (e.g., depending on use case and harvested energy availability).

In some examples, devices may determine relative distance and spatial relationships by transmitting and receiving wireless signals, such as RF signals, using omnidirectional or semi-directional antennas, enabling comprehensive 360-degree detection coverage. Such devices may operate in monostatic configurations, in which both the transmit and receive functions are performed by a single device, or in bistatic configurations where signal transmission originates from one device and reception occurs at another. In either case, proximity detection may include analyzing the propagation characteristics of the wireless signal across space (e.g., including direct line-of-sight and multipath reflections resulting from environmental surfaces). In some aspects, devices described herein may collect wireless signal attributes (e.g., channel state information (CSI), etc.). For example, CSI data can include amplitude measurements, time-of-flight characteristics, phase information, signal-to-noise ratio (SNR), and/or frequency-domain representations of signals received over multiple subcarriers. In some cases, CSI is expressed as complex values comprising in-phase (I) and quadrature (Q) components across a range of discrete frequency tones or sub-bands, which may allow fine-grained resolution of channel conditions. These I/Q measurements may be extracted at higher sampling rates to capture transient changes in signal quality and channel dynamics resulting from movement, interference, or environmental change. Comprehensive CSI analysis may enable the devices to robustly differentiate between direct signal paths (e.g., the shortest straight-line path between transmitter and receiver) and indirect or reflected paths that result from multipath propagation. This differentiation may be used in cluttered or complex wireless environments, where reflections from walls, ceilings, objects, and/or moving things may otherwise degrade the accuracy of distance estimation. By identifying the shortest path with minimal delay and consistent amplitude-phase characteristics, the devices may isolate the most reliable signal for proximity threshold evaluation. In some instances, signal phase coherence and group delay information derived from CSI may be used to estimate changes in relative position, determine motion vectors, and identify when another tagged device is moving closer or farther away.

In some aspects, CSI-based estimates can be computed locally when detected (e.g., in real time) using digital signal processing (DSP) pipelines embedded in firmware or hardware logic. In some examples, the devices may continuously monitor changes in CSI profiles and correlate them with previously observed signal patterns, supporting adaptive filtering, hysteresis-based alert thresholds, and/or motion-inferred proximity modulation. The capability to extract and interpret complex CSI may enable proximity sensing devices to function with enhanced spatial accuracy, improved responsiveness, and increased resilience to wireless interference or environmental variability. In some implementations, CSI sampling may be prioritized over raw received signal strength indicator (RSSI) measurements due to its high resolution and multi-dimensional data representation. As a result, in some cases, the devices may offer superior proximity alert performance compared to narrowband or other systems, such as in indoor, high-mobility, or multipath-prone environments.

In some cases, proximity sensing devices may leverage enhanced CSI analytics to extract advanced spatial metrics from received wireless signals, including, but not limited to, angle-of-arrival (AoA), azimuth and elevation estimates, time-of-flight (ToF), Doppler frequency shifts, phase rotation, and delay spread characteristics. These signal-level parameters may be derived through high-resolution signal processing techniques performed by microcontrollers or signal processing units of the devices. In some instances, AoA estimation may be performed using an antenna array or multi-element receiver architecture, where the relative phase differences between antenna elements allow angular inference of the incoming signal vector. Azimuth and elevation angles may be resolved using vertical and horizontal diversity in antenna geometry, offering enhanced directional discrimination even in dense or multi-level environments. ToF information, which measures the elapsed time between transmission and reception of a signal, may be used to determine absolute or relative distances with sub-meter accuracy when paired with high-frequency sampling clocks or time-synchronized transceiver modules. Doppler shifts may indicate relative movement between devices, which may allow detection of approach and/or retreat, and may be combined with motion vector estimates to inform alert prioritization. In some examples, rapid changes in Doppler frequency may be interpreted as high-speed closing velocities, which may prompt the device to escalate alert intensity or shorten proximity thresholds in response. Multipath reflection profiles, derived from the time-domain or frequency-domain behavior of received signals, may enable the device to differentiate between signal components arriving through direct paths and those arriving via reflection, diffraction, or scattering.

In some examples, reflected paths with delay, low SNR, or erratic phase characteristics may be ignored or deprioritized in order to focus proximity calculations on reliable and spatially relevant components. In some cases, short-delay reflections within a designated threshold (e.g., such as within one to two meters) may be considered valid proximity indicators, such as when the direct path is obstructed. This form of signal-level filtering and path prioritization may improve detection performance in non-line-of-sight (NLOS) conditions, cluttered indoor environments, and/or operational settings involving moving obstacles, variable terrains, or metallic structures that induce significant RF distortion. In some instances, the ability to extract and act upon detailed signal characteristics improves the robustness and responsiveness of proximity alerts, such as in scenarios where traditional line-of-sight estimation would fail. In some examples, CSI-derived metrics may be dynamically weighted based on environmental heuristics, historical signal patterns, and/or predictive tracking algorithms, which may allow the system to adjust its spatial awareness strategy in real time as conditions evolve.

In some aspects, proximity sensing devices may use antenna arrays with two or more spatially separated antenna elements to enable precise directional sensing and angle-of-arrival (AoA) estimation. By analyzing the differential phase shifts, amplitude variations, and timing offsets in the wireless signals received across individual antenna elements, the devices may estimate the azimuth and/or elevation angle from which a signal was transmitted. In monostatic configurations, where both transmission and reception occur on the same device, the antenna array may capture multipath components from various angles, which may allow the device to isolate the most likely direction of the incoming signal. In bistatic configurations, where the signal is transmitted from one device and received by another, both the transmitting and receiving arrays may contribute to more precise spatial triangulation. The AoA estimation process may be performed using digital beamforming techniques, subspace decomposition methods, or simplified lookup-table-based interpolation models adapted for embedded microcontroller environments.

In some instances, the devices may include orthogonally arranged antenna pairs to enable simultaneous tracking of horizontal and vertical angular displacement. For instance, dual-axis capability may be beneficial in multi-level environments, such as stadiums, stairwells, warehouses, and/or climbing facilities, where the relative height between devices can play a role in spatial awareness. Directional sensitivity may be further refined by integrating real-time orientation and pose information obtained from inertial sensors, including gyroscopes, accelerometers, magnetometers, and/or fused IMUs. These sensors may provide angular velocity, linear acceleration, and magnetic heading data, which may be combined with metrics derived from wireless signals to correct for device tilting, rotational lag, or movement-induced drift.

In some examples, directional awareness may enable nuanced alert behavior. For instance, in athletic drills such as soccer or basketball training, the devices may provide vibration alerts when a teammate with a tagged device is approaching from behind or from a user's blind spot. In industrial safety applications, alerts may be intensified if tagged equipment approaches at a threshold speed from an angle with reduced visibility (e.g., behind a shelf or pallet rack). In assistive navigation scenarios, directional sensing may help visually impaired users orient themselves relative to certain waypoints, mobile guides, or dynamically changing environmental obstacles. In such examples, the devices may generate asymmetric haptic patterns (e.g., left-side vibration for a leftward approach) to guide the user's response and enhance situational perception. The ability to combine AoA sensing based on wireless signals with real-time motion and orientation data may enable robust, context-aware spatial feedback that can remain effective in environments with partial obstructions, motion clutter, and/r multipath interference.

In some instances, proximity sensing devices may be configured to correlate real-time CSI-derived proximity measurements with orientation and motion sensor data to enhance spatial awareness and responsiveness. The integration of CSI analysis with data from other sensors (e.g., gyroscopes, accelerometers, magnetometers, IMUs, etc.) may allow for multi-dimensional context inference and may support dynamic adjustments to proximity alert behavior based on changes in device pose, velocity, acceleration, or directional heading. This sensor fusion approach may enable the devices to distinguish between static proximity scenarios and high-velocity interactions which may allow for differentiated alert modalities. For example, a proximity alert generated during slow forward movement toward a tagged device may trigger a gradual vibration increase, whereas an alert triggered during rapid lateral movement (e.g., such as during a sprint or evasive maneuver) may cause more immediate and/or intense haptic feedback. In some implementations, the devices may calculate motion vectors based on accelerometer and gyroscope data, aligning these vectors with the estimated angle of approach from the CSI to determine whether the user is moving toward or away from the tagged device. When motion vectors indicate retreat, the devices may suppress or de-escalate the feedback. On the other hand, when motion vectors indicate convergence, the devices may activate anticipatory alerts based on extrapolated intersection points.

In some aspects, proximity sensing devices may implement predictive movement models using real-time CSI sampling and IMU-derived pose estimation. These models may use Kalman filtering, complementary filtering, or inertial dead-reckoning techniques to track device orientation and displacement over time. When correlated with signal strength and multipath consistency metrics from the CSI, the devices may estimate the current spatial relationship and short-term movement trajectory between devices. For instance, if the CSI indicates a closing signal path and the IMU indicates a forward lean with increasing gait acceleration, a device may infer that the user is rapidly approaching the tagged target and shorten the distance threshold configured to trigger an alert. In assistive navigation scenarios (e.g., such as those involving users with visual impairments) this sensor fusion capability may be used to modulate alert intensity based on proximity and spatial orientation and movement direction. For example, a wearable electronic device may determine that a user is veering left toward a fixed tagged obstacle and initiate directional-haptic feedback on the left side of the body to prompt corrective motion. In another example, when assisting emergency responders navigating low-visibility environments (e.g., fire rescue or search and rescue), the device may enhance proximity accuracy by using fused sensor data to distinguish between reflected signals from walls and direct paths from tagged teammates, equipment, or exit markers.

In some instances, magnetometer data may be used to calibrate directional orientation relative to the Earth's magnetic field (e.g., which may improve consistency across sessions or environments with inconsistent RF reflections). When fused with CSI profiles, this absolute heading data may enable coordinated movement training among groups, where directional cues are aligned with real-world cardinal directions or training layouts. The combined use of CSI-based ranging and IMU-based motion state analysis may create a feedback system that is responsive to real-time dynamics and capable of maintaining stable proximity sensing in unpredictable or cluttered environments.

Moreover, the wearable electronic devices may implement software used to process sensor data, use the sensor data to make various determinations and/or generate sensing outputs, aggregate sensor data, filter sensor data, use sensor data to make predictions, etc. In some cases, the wearable electronic devices can use artificial intelligence (AI) and/or machine learning (ML) software to process sensor data and/or generate outputs based on sensor data (and optionally other data) such as, for example, object detection models, recognition models, presence detection and/or prediction models, tracking and/or localization models, event and/or activity detection models, scene detection models, etc.

In some cases, the wearable electronic devices may incorporate AI and/or ML models used to support, implement, facilitate, and/or improve any of the capabilities of the wearable electronic devices described herein, such as sensing/detection capabilities, prediction capabilities, notification capabilities, and/or any other capabilities. The AI/ML models can be adaptive and can learn and optimize model and/or device operations, settings, capabilities, parameters, etc. In some cases, such learning and optimization can occur as the wearable electronic devices are used and/or the AI/ML models are trained/updated. The AI/ML models can learn patterns, behaviors, preferences, and/or parameters, and use the learned patterns, behaviors, preferences, and/or parameters to update, optimize, and/or customize one or more capabilities and/or settings of the wearable electronic devices. The AI/ML models can learn information (e.g., patterns, behaviors, preferences, parameters, etc.) and/or optimize settings and/or capabilities of the wearable electronic devices based on training data, data provided to the AI/ML models, and/or data obtained (e.g., collected, aggregated, generated, interpolated, extrapolated, etc.) by the wearable electronic devices.

Such data can include, for example and without limitation, device data from the wearable electronic devices or any component(s) thereof (e.g., device activity data, device performance data, device errors, device alerts, device communications data, hardware data, device settings, device event data, device parameters, device inputs and/or outputs, etc.), sensor data/inputs (e.g., motion data, proximity data, acoustic data, image data, fused sensor data, location data, environmental data, touch input data, altitude measurements, heading measurements, inertial measurements, pose or position information, impact sensor data, etc.), user inputs, software data (e.g., software activity and/or event data, software error logs, software statistics, software operations data, software inputs and/or outputs, software settings, synthetic data generated by software such as AI/ML models, etc.), user data (e.g., user activity, user preferences, user inputs, user behavior data, user patterns, user profile data, user characteristics information, user historical data, etc.), usage data (e.g., user usage statistics and/or patterns, device usage statistics, etc.), ground truth data training data sets, and/or any other data. As noted above, in some cases, the sensor data/inputs can include environmental data. The environmental data can include, for example and without limitation, temperature measurements, humidity measurements, ambient light measurements and/or light intensity measurements, noise levels, atmospheric pressure measurements, airflow measurements, and/or any other environmental data.

The AI/ML models of the wearable electronic devices can be trained to update, optimize, and/or customize a configuration of the AI/ML models, a behavior of the wearable electronic devices facilitated and/or implemented by the AI/ML models, model parameters, device parameters and/or settings, device capabilities, a device and/or model performance, device and/or software behaviors, etc. For example, the AI/ML models can be trained on large and/or diverse datasets to establish baseline, optimized, and/or customized sensing/detection, recognition, prediction, alerting/notification, and/or operating behaviors across a broad range of environments, users, contexts, device configurations, use cases or applications, scenarios, conditions, and/or any other factors.

In some cases, the AI/ML models can be updated, optimized/refined, and/or customized during a training phase and/or in real-time (or near real-time) using any of the data previously described, such as training data, device data, user data, activity/usage data, learned patterns, environmental data, inputs, event data, sensor data, and/or any other data. The AI/ML models can use data obtained by the AI/ML models (e.g., sensor data, statistics, user data, device data, software data, event data, configuration data, inputs, outputs, communication data, preference data, profile data, usage data, learned data, etc.) to adapt, customize, adjust, update, select, configure, manage, determine, and/or optimize any operation, setting, parameter, behavior, function, capability/functionality, mode, and/or feature of the wearable electronic devices. For instance, contextual data may influence how certain operations are triggered (e.g., how alerts are triggered, how sensing operations are triggered, how different operating modes are triggered, etc.) and/or how certain thresholds, such as detection and/or output thresholds (e.g., proximity thresholds, alert thresholds, etc.), are adjusted (e.g., dynamically adjusted). The contextual data can include, for example and without limitation, motion state data, geolocation data, ambient light levels, ambient light intensity levels, sound levels, user and/or device movement (e.g., user and/or device speed, acceleration, velocity, etc.), moisture levels, pressure levels, altitude levels, pose information (e.g., position information, orientation information, etc.), temperature measurements, etc.

The adaptive learning of the AI/ML models may allow the wearable electronic devices to distinguish between contextual nuances (e.g., environment-specific nuances, user-specific nuances, location-specific nuances, usage nuances, etc.). For example, the adaptive learning of the AI/ML models of the wearable electronic devices can allow the wearable electronic devices to recognize (e.g., via the AI/ML models) that a transparent surface like a sliding glass door may represent a threat (e.g., a threat of collision and associated damage, etc.) in one environment but may not represent a threat in another environment, and tailor a behavior of the wearable electronic devices accordingly, such as an alert behavior. The AI/ML models may also reduce false positive alerts, sensing/detection results, triggering events, etc. To illustrate, the intelligent and/or adaptive learning capabilities of the AI/ML models can allow the AI/ML models (and thus the wearable electronic devices) to detect, filter, and reduce false positive alerts and personalize the user experience over time.

Each wearable electronic device may optionally include a single AI/ML model or multiple AI/ML models (and/or an AI/ML model with multiple heads, branches, etc.). The AI/ML model(s) implemented by a wearable electronic device can include any type of AI/ML model(s), which may or may not depend on the type of electronic device, the use/application of the wearable electronic device, a device tier of the wearable electronic device (e.g., a premium or higher-cost tier versus a standard or lower-cost tier), the type of device use and/or capabilities, and/or any other factors. Non-limiting examples of AI/ML models include convolutional neural network (CNN) models, recurrent neural network (RNN) models, large language models (LLMs), deep belief networks (DBNs), AI/ML models with attention and/or generative capabilities (e.g., transformer models, autoencoder or variational autoencoder (VAE) models, encoder-decoder models, encoder-only models, decoder-only models, generative adversarial network (GAN) models, long short-term memory (LSTM) models, feed-forward neural network models, perceptrons, artificial neural network (ANN) models, and/or any other AI/ML models.

In some cases, a wearable electronic device can implement an AI/ML model(s) trained to process sensor data and/or wireless signals and determine spatial information (e.g., presence, distance, proximity, location, position, velocity, directionality, and/or motion information) based on the sensor data and/or wireless signals. The AI/ML model(s) can be trained to detect the spatial information based on sensor data and/or wireless signals transmitted or received from another device, object, anchor, or target. In some cases, the AI/ML model(s) can be trained to additionally detect spatial information based on sensor data and/or wireless signals generated by one or more devices of the wearable electronic device such that the wearable electronic device can determine spatial information without (or optionally with) relying on or communicating with another device, anchor, object, and/or target. In some examples, the AI/ML model(s) can be trained to detect spatial information and generate related alerts in anchorless or no-infrastructure scenarios and therefore relying solely on the hardware and software of the wearable electronic device, as well as scenarios that rely on or use other devices, anchors, infrastructure, tags, targets, etc.

Moreover, the AI/ML model(s) can be trained to filter spatial awareness signals and/or data (e.g., wireless signals, sensor signals/data, etc.) to remove noise or selectively use, prioritize, weight, and/or emphasize a subset of the spatial awareness signals and/or data. For example, in a training scenario where multiple users with wearable electronic devices are located within an area, a wearable electronic device in the area may receive or detect spatial awareness signals and/or data from various wearable electronic devices. However, in a particular implementation, the wearable electronic device may only be interested in spatial awareness signals and/or data from a subset of the wearable electronic devices. For example, if the user associated with the wearable electronic device is engaged in a training activity with two other users associated with two other wearable electronic devices, the wearable electronic device associated with the user may only be interested in spatial awareness signals and/or data from the two other wearable electronic devices, but may nevertheless receive or detect spatial awareness signals and/or data from other devices. In such cases, the AI/ML model(s) of the wearable electronic device can be trained to filter spatial awareness signals and/or data from the other devices and, instead, only process or focus on spatial awareness signals and/or data from the two other wearable electronic devices. In this way, the AI/ML model(s) can determine spatial information with respect to the two other wearable electronic devices and ignore related signals and/or data from other devices.

In some cases, a wearable electronic device can make adjustments to alert signals based on one or more previous alerts. For example, the wearable electronic device can adjust the alert type(s) (or combination of alert types), magnitude(s), pattern(s), and/or any other attribute(s) based on one or more previous alerts and information about a status of the wearable electronic device within a respective period after the one or more alerts (e.g., a fixed period, a configurable period, and/or a variable period that may depend on the type of alert(s), the circumstances of the alert(s), the trigger(s) and/or severity or attribute of the trigger(s) of the alert(s), etc.), a user action/behavior (e.g., a response, a movement, an interaction with the wearable electronic device, etc.) in response to and/or within a period of the alert(s), a response to the alert(s), one or more conditions after or within a period after the alert(s), and/or any other cues.

To illustrate, if the wearable electronic device issues an alert in a particular context and based on a particular trigger(s), the wearable electronic device can determine whether a user (e.g., the user of the wearable electronic device) noticed the alert (e.g., based on a user input turning off the alert or a lack of such input; based on an interaction between the user and the wearable electronic device within a period after the alert; based on a detected activity or pattern of activity of the user/device after, within a period after, or in response to the alert, such as specific motion or a pattern of motion of the wearable electronic device (and thus the user) after, within a period after, or in response to the alert; based on user feedback; etc.) or whether the user responded to the alert (e.g., within a period of time after the alert) in an expected manner (e.g., according to one or more predetermined responses to such type of alert and/or an alert generated in such a context and based on such a trigger(s), according to one or more learned responses by an AI/ML model(s) of the wearable electronic device, etc.). If the wearable electronic device determines that the user did not notice the alert or respond to the alert (e.g., within a period after the alert) in an expected manner, the wearable electronic device may adjust a type(s), magnitude(s), pattern(s), duration, and/or other attribute of the alert and/or of subsequent alerts generated in that particular context and/or in response to that particular trigger(s).

For example, if the wearable electronic device issues an audio alert having a threshold urgency, priority, and/or importance and/or corresponding to a threshold threat/danger level of a condition triggering such alert, such as a certain level of threat of collision (e.g., based on a detected relative distance, trajectory, speed, direction, and/or size between the wearable electronic device and a threat such as an object or person and/or based on a size or characteristic of such threat) and/or a certain level of estimated danger or damage from such collision (e.g., estimated based on a relative distance, trajectory, speed, direction, and/or size between the wearable electronic device and the threat and/or based on a size, speed, acceleration, and/or characteristic of the threat) and the wearable electronic device detects that a pattern (e.g., a position, a trajectory, a speed or velocity, an acceleration, a direction of motion, a type of motion, etc.) of the wearable electronic device (and thus the user) did not change within a period after the alert, the user did not interact with the wearable electronic device (e.g., by turning off or acknowledging the alert, by providing an input to the wearable electronic device, etc.) within a period after the alert, and/or the user did not respond to the alert in an expected or particular manner (e.g., a fixed or predetermined manner, a learned manner, a manner calculated to be a safe or acceptable response in such circumstances, etc.), the wearable electronic device may adjust a subsequent alert associated with that context and/or trigger and/or future alerts triggered based on such context and/or trigger. The wearable electronic device can adjust such alert(s) to ensure (or increase the likelihood) that the user notices the alert, recognizes the urgency, importance, priority, and/or threat level associated with the alert, and/or convey a greater urgency, importance, threat level, and/or priority. The wearable electronic device can adjust a type(s), magnitude(s), pattern(s), duration, and/or other attribute of such alert(s). For example, the wearable electronic device can increase a volume and/or output pattern of the audio alert, increase a duration of the audio alert (e.g., relative to the duration otherwise implemented or configured in such situation), output another type(s) of alert (e.g., a haptic alert, a visual alert, a combination of alerts, etc.) in addition to or instead of the audio alert, etc.

If, instead of an audio alert the wearable electronic device outputs a different type of alert in the previous example, such as a visual or haptic alert, the wearable electronic device can similarly adjust the type(s), magnitude(s), pattern(s), duration, and/or other attribute of the alert generated in that circumstance and/or future circumstances. For example, if the alert is a visual alert, the wearable electronic device can prolong the duration of alert configured in such circumstances and/or generate an audio and/or haptic alert (e.g., in addition to or instead of the visual alert). If the wearable electronic device detects that the ambient light levels are above a threshold and the alert type triggered is a visual alert, the wearable electronic device can change a color of the visual alert to increase a likelihood that the user will notice the alert (and/or recognize the importance, urgency, threat level, and/or priority associated with such alert or alert condition) or output a haptic and/or audio alert (e.g., in addition to or instead of the visual alert) to increase the likelihood that the user will detect an alert given the ambient light levels detected (and/or recognize the importance, urgency, priority, and/or threat level associated with the alert or alert condition). If instead of a visual or audio alert, the alert in the previous example is a haptic alert, the wearable electronic device can increase a duration and/or magnitude of the haptic alert and/or output a visual and/or audio alert (e.g., in addition to or instead of the haptic alert or the modified haptic alert) to increase the likelihood that the user will notice an alert or recognize an urgency, importance, priority, and/or threat level of the alert and associated condition(s). In some examples, the alert adjustments can be determined, adapted, and/or learned by an AI/ML model(s) of the wearable electronic device, as previously explained.

The wearable electronic devices can support implementations with adaptive learning (e.g., via AI/ML models) as previously described. In some cases, the wearable electronic devices can additionally or alternatively support pre-programmed implementations, such as pre-programmed or statically programmed behavior profiles, device parameters, settings, functionalities, etc. The adaptive learning and/or pre-programmed features of the wearable electronic devices can allow the systems and techniques described herein to be deployed across a wide range of device classes/types, use cases and/or applications, operational environments, contexts, scenarios, and/or any other conditions. In some examples, the adaptive learning and/or pre-programmed features of the wearable electronic devices can allow the wearable electronic devices to be used and/or optimized/customized for different users and/or applications.

In some examples, the wearable electronic devices may operate based on pre-programmed movement patterns, pre-programmed user profiles, pre-programmed device profiles, pre-programmed parameters/variables, pre-programmed or static environmental profiles, and/or any other pre-programmed/static features. For example, the wearable electronic devices may have pre-programmed movement patterns, such as vehicle movement patterns, bicycle and/or motorcycle movement patterns, user movement patterns (e.g., user-specific movement patterns, group-specific movement patterns and/or movement patterns of groups of user characteristics such as age groups and/or physical attributes or size ranges, etc.), animal movement patterns (e.g., movement patterns of specific types of animals such as selected or designated animal types, movement patterns of animals within a certain size range(s), movement patterns of certain animals selected based on a location associated with the wearable electronic devices such as animals that are more common to respective geographic areas where the wearable electronic devices are located/used, etc.), movement patterns of one or more objects or types of objects (e.g., movement patterns of skateboards, drones, debris, sports balls, etc.), movement patterns configured for specific uses/applications of the wearable electronic devices (e.g., sports or training applications, use cases involving certain activities such as hiking or sledding, safety and/or assistive technology applications, virtual and/or augmented reality applications, gaming applications, entertainment applications, etc.), and/or any other movement patterns. In some cases, the wearable electronic devices may also have pre-programmed or fixed thresholds, such as detection and/or alert thresholds, and/or behavior parameters, such as alert parameters (e.g., vibration settings, audio alert settings, visual alert settings, etc.).

In some examples, the wearable electronic devices may or may not be configured to suppress certain alerts, events, and/or operations. For example, the wearable electronic devices can be configured to suppress alerts for static objects (e.g., walls, furniture, trees, etc.) by default, while allowing alerts for moving threats to be generated and allowing moving threats to be detected/recognized. The wearable electronic devices may or may not allow any alert suppression settings to be modified (e.g., turned off, updated, customized, optimized, changed, etc.). In some examples, the wearable electronic devices may include firmware-defined settings, parameters, and/or behaviors such as firmware-defined vibration settings, thresholds (e.g., proximity thresholds, motion thresholds, etc.), and/or alert behaviors corresponding to certain types of detected movement or movement patterns (e.g., movement from vehicles, bicycles, motorcycles, humans, animals, moving objects, etc.).

In some cases, the wearable electronic devices can implement pre-programmed behavior/configuration profiles without real-time learning, such as real-time, adaptive AI/ML learning. The pre-programmed (e.g., statically defined) behavior/configuration profiles may allow the wearable electronic devices to operate without use of AI/ML models and/or implement a more lightweight and lower-power operation (e.g., relative to adaptive AI/ML learning implementations) while still providing effective/accurate behaviors and functionalities, such as alerting functionalities. In some cases, the pre-programmed behavior/configuration profiles can be used in and/or may be more suitable for deployments of the wearable electronic devices determined to have a lower need for real-time learning and/or where real-time learning is deemed unnecessary.

Various aspects of the systems and techniques described herein will be discussed below with respect to the figures. The disclosure now turns to FIG. 1.

FIG. 1 is a block diagram of an example communication system 100, according to some examples of the present disclosure. Communication system 100 can include a user 110 associated with a wearable alert system 102. The user 110 can carry the wearable alert system 102 (or a device implementing the wearable alert system 102) or wear the wearable alert system 102 on a part of the body of the user 110 or a garment worn by the user 110. Communication system 100 may optionally include another user 112 associated with another wearable alert system 104, and/or one or more computing devices (e.g., computing device 120A, computing device 120B, and/or computing device 120N) communicatively coupled to the wearable alert system 102 and/or wearable alert system 104.

In some examples, wearable alert systems 102 and 104 are operable to wirelessly receive (and optionally transmit) signals, such as signals used to make proximity/presence detections as described herein, and generate alerts (e.g., local haptic and/or other sensory alerts) in response to distance thresholds and/or movement thresholds/conditions. In some configurations, communication system 100 can also include network 125 shown in FIG. 1. Network 125 can include a private and/or public network(s) and/or a wired and/or wireless network(s). For example, network 125 can include a local area network (LAN), a wireless LAN (WLAN), a personal area network (PAN), a cellular network (e.g., LTE, 5G), a wide area network (WAN), the Internet, a cloud network, an Internet Service Provider (ISP) network, an Ethernet network, and/or any other network or combination thereof.

In some examples, wearable alert systems 102 and/or 104 may each include one or more hardware and software components configured to perform proximity detection (e.g., presence detection, distance detection, collision detection, etc.), wireless signaling, directional awareness, and feedback/alert generation. The wearable alert systems 102 and/or 104 may each include a wireless transceiver, such as an RF transceiver, configured to transmit signaling pulses and receive incoming signals from other devices, such as other tagged or paired devices, operating within a configured or threshold communication range. The signaling pulses may be transmitted periodically or in response to specific triggers or events, such as motion initiation or threshold detection triggers. In some implementations, the transceivers can be configured to transmit and receive UWB signals, which are characterized by high temporal resolution and support precise time-of-flight and distance estimation. The UWB transmissions may enable accurate ranging in line-of-sight and non-line-of-sight conditions and may offer robustness against multipath interference and reflection artifacts, such as in indoor environments (e.g., such as gymnasiums, warehouses, stairwells, or congested office spaces). In some aspects, wearable alert systems 102 and/or 104 may each include or incorporate signal processing circuitry to analyze received pulse signals/patterns, measure round-trip signal propagation times, determine estimated relative positions, and filter signal paths based on signal strength, time delay, or angle of arrival.

In some aspects, wearable alert systems 102 and/or 104 may each be configured to additionally or alternatively use other or complementary wireless protocols for proximity/presence signaling and peer/tagged device communication. For instance, wearable alert systems 102 and/or 104 may use Bluetooth Low Energy (BLE) to transmit advertising packets or short-range identifiers continuously, at configurable intervals, or according to specific triggers. In some implementations, BLE receivers may scan for specific beacon patterns or group identifiers, and trigger proximity analysis upon detection of a recognized source. In some examples, wearable alert systems 102 and/or 104 may additionally or alternatively support other wireless protocols, such as other peer-to-peer protocols (e.g., Wi-Fi Direct, ZigBee®, Z-Wave, or other standards-based or proprietary low-power wireless communication methods). These protocols may enable direct communication without reliance on a wireless router, base station, or server infrastructure. In some cases, wearable alert systems 102 and/or 104 may alternate between transmit and receive states (e.g., in a time-multiplexed fashion) to implement bidirectional ranging, handshake validation, or role-switching functionality.

In some aspects, the choice of wireless protocol may be determined dynamically based on one or more factors such as, for example, system configuration, user preferences, available hardware interfaces, operational energy budget, or contextual conditions such as ambient signal congestion or indoor/outdoor deployment mode. In some examples, wearable alert systems 102 and/or 104 may include a protocol selection layer configured to automatically select the most reliable or energy-efficient communication mode from a set of supported signaling schemes.

In some examples, wearable alert systems 102 and/or 104 may operate in conjunction with any of the computing devices 120A-120N (collectively "computing devices 120" hereinafter) via network 125 to communicate data such as proximity/presence signals and/or configuration updates, perform remote diagnostics, synchronize training parameters, etc. In some cases, wearable alert systems 102 and/or 104 may operate in a standalone mode without reliance on any external computing infrastructure. For instance, the devices may implement onboard logic, state machines, or machine learning models trained to classify proximity patterns, infer behavioral context, or adapt threshold conditions dynamically based on detected user/device behaviors or environmental characteristics. In some cases, wearable alert systems 102 and/or 104 may include AI-based adaptive learning for gesture recognition, anomaly detection, predictive alerting, presence detection, threshold finetuning, etc.

In some aspects, wearable alert systems 102 and 104 may operate autonomously in communication with each another, enabling proximity or presence detection, distance measurement, and alert generation without requiring computing devices 120 or access to network 125. In some examples, any of the computing devices 120 can be configured to transmit signals that wearable alert systems 102 and 104 can respectively detect from a threshold range. Wearable alert systems 102 and 104 can use signals from any of the computing devices 120 to detect a proximity, presence, or distance of any of the computing devices 120 that emitted such signals, and generate alerts as described herein, such as presence alerts indicating a presence or proximity of such computing devices relative to the wearable alert system(s) that detected such signals (and thus the user(s) associated with such wearable alert system(s)).

In some examples, communication system 100 may support hybrid configurations in which wearable alert systems 102 and 104 optionally exchange proximity data or system status data with one or more of the computing devices 120. The computing devices 120 may include, but are not limited to, smartphones, computers (e.g., tablet computers, laptop computers, desktop computers, etc.), transmitter devices, servers, smartwatches, consoles, equipment or tools with electronic devices, structures (e.g., walls, doors, etc.) with electronic devices, objects with electronic devices, etc. Any of the computing devices 120 may be tagged or paired with wearable alert systems 102 and 104 to allow wearable alert systems 102 and 104 to detect such computing devices (and/or associated structures, objects, etc.) and generate alerts, as further described herein. In some cases, any of the computing devices 120 may additionally or alternatively perform other functions such as storing device pairing profiles, managing team-based configuration presets, issuing instructions, issuing global override commands (e.g., silence all haptic alerts), aggregating historical data for review or training purposes, sending updates, sharing data such as parameters, relaying information, etc.

In some instances, any of the computing devices 120 may execute proximity monitoring software capable of receiving telemetry or status data from the wearable alert systems 102 and 104, transmitting proximity/presence detection signals to wearable alert systems 102 and 104, displaying real-time spatial positioning of tagged/associated users, visualizing relative motion paths on a graphical interface, coordinating communications and/or functions between wearable alert systems, etc. For example, during athletic drills or team exercises, a coach using computing device 120A may monitor spatial violations (e.g., players clustering too closely), issue instructional feedback, or modify a respective behavior of wearable alert system 102 and/or 104 (e.g., sensitivity levels, group filters). In some examples, in safety-focused environments such as construction zones, a supervisor using device 120B may be alerted when a worker (e.g., user 110)

associated with wearable alert system 102 enters a restricted proximity zone near another worker (e.g., user 112) operating heavy equipment while wearing wearable alert system 104. In such cases, network 125 may optionally serve as a relay for system-wide coordination, device firmware updates, remote diagnostics, or integration with third-party safety systems or enterprise monitoring dashboards.

In some examples, any of the computing devices 120 can emit signals used by wearable alert system 102 and/or 104 to detect a presence/proximity of such computing devices and generate alerts as described herein. In such examples, the computing device(s) from the computing devices 120 that emits/emit such signals can be affixed or coupled to a target, such as a static structure (e.g., a building, etc.) and/or a static or moving object, human, animal, vehicle, etc. For example, computing device 120A can be affixed to a wall and configured to emit wireless signals. Wearable alert system 102 and/or 104 can detect such signals when the computing device 120A is within a threshold range, and use the signals to detect a presence or proximity of the computing device 120A (and thus the wall) and determine whether to generate an alert for the user 110 and/or 112. As another example, the computing device 120A can be affixed to a goal post or training cone used by the user 110 and/or 112 during an activity, such as a sports training or exercise. The computing device 120A can transmit wireless signals that the wearable alert system 102 and/or 104 can detect when the computing device 120A (and thus the goal post or training cone) is within a threshold range and/or a presence of the computing device 120A (and thus the goal post or training cone) relative to the wearable alert system 102 and/or 104 (and thus user 110 and/or 112). The wearable alert system 102 and/or 104 can use such signals and detection results to determine whether to generate an alert for the user 110 and/or 112 as further described herein. The alert can be used to notify the user 110 and/or 112 of a presence and/or proximity of the goal post and/or training cone, warn the user 110 and/or 112 of a potential collision with the goal post and/or training cone, train a respective movement of the user 110 and/or 112 relative to the goal post or training cone, etc.

In some examples, network 125 may include other network and/or compute infrastructure such as one or more access points, edge computing gateways, mesh routers, cloud synchronization modules configured to extend communication range, compute resources, and/or any other compute resources such as resources used to offload compute-intensive analytics or maintain redundancy in data storage. For instance, wearable alert systems 102 and/or 104 may offload CSI-derived telemetry or motion sensor logs to one or more of the computing devices 120 for longer-term archival, comparative training analysis, or anomaly detection. In some cases, network 125 may provide gateway functionality that bridges short-range or peer-to-peer interactions with broader multi-user networks, enabling users across different locations (e.g., different rooms, floors, or fields) to participate in shared awareness scenarios. For example, in a warehouse setting with overlapping work zones, wearable alert system 102 may detect user 112 entering a shared threshold zone, and computing device 120B may visualize the encounter in real time while computing device 120N logs the incident for safety audit review.

Figure 2:
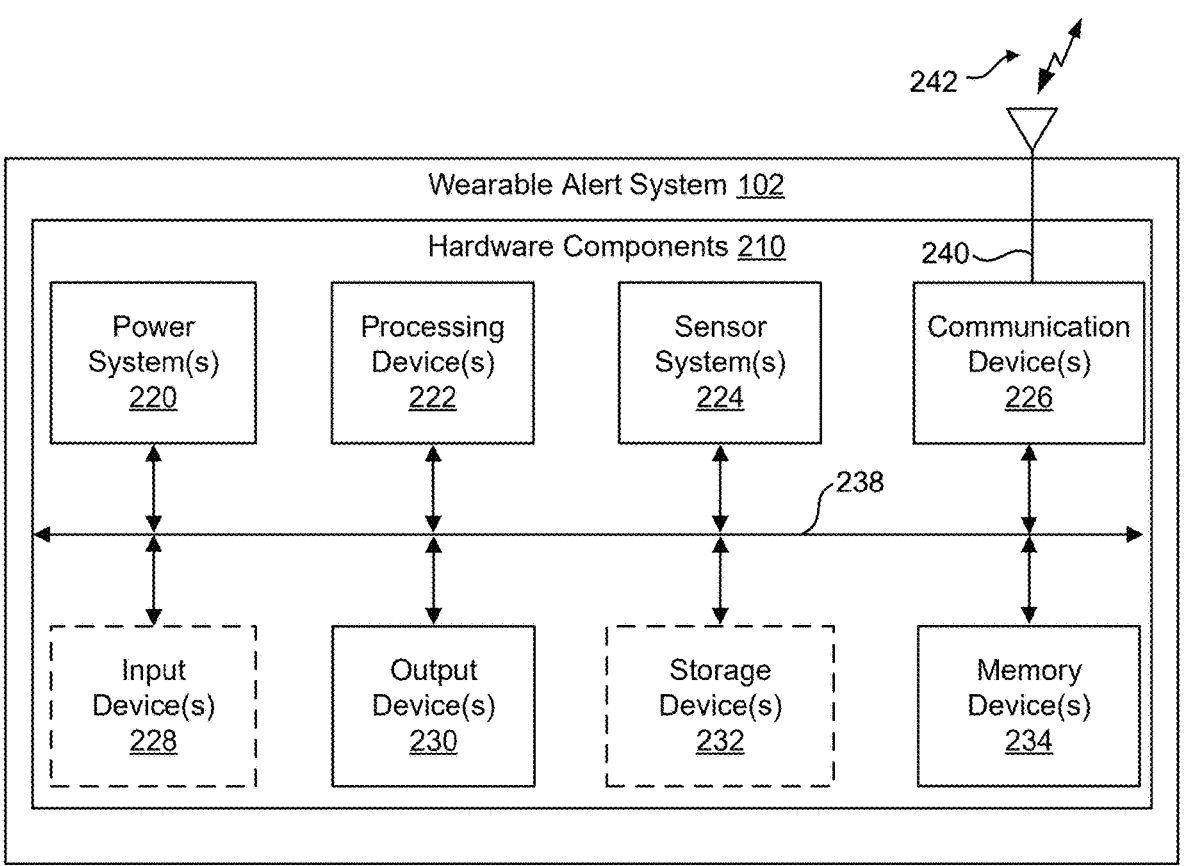
FIG. 2 is a block diagram illustrating an example of a wearable alert system, according to some examples of the present disclosure.

FIG. 2 is a diagram illustrating an example architecture of wearable alert system 102, according to some examples of the present disclosure. While the example architecture in FIG. 2 is shown with respect to wearable alert system 102, one of ordinary skill in the art will recognize from the disclosure that the example architecture can be used to implement any other electronic device described herein such as wearable alert system 104 and/or any of the computing devices 120.

As shown in FIG. 2, wearable alert system 102 may hardware components 210 that may support any of the operations/functionalities of wearable alert system 102 described herein, such as presence and proximity detection, wireless communication, sensor data processing, user alert and/or feedback generation, distance estimation, device and/or object tracking, localization, distance estimation, spatial awareness, spatial-awareness based training, etc. Hardware components 210 may include power system(s) 220, processing device(s) 222, sensor system(s) 224, communication device(s) 226, output device(s) 230, and memory device(s) 234. In some cases, hardware components 210 may optionally include input device(s) 228, storage device(s) 232, and/or any other component/device such as other computer resource(s), network resource(s), processing resource(s), input and/or output resource(s), etc. Hardware components 210 may be electrically and/or communicatively coupled via a connection(s) 238, such as a system interconnect, internal bus, link(s) (e.g., wired and/or wireless link(s)), etc. In some cases, communication device(s) 226 may interface with one or more antennas 240 to transmit and/or receive wireless signals 242, such as RF signals. In various implementations, the components shown in FIG. 2 may be distributed across a one or more circuit boards, flexible printed circuits, rigid-flex interconnect assemblies, multilayer substrates, system-on-chip (SoC) devices, single-board computers (SBCs), motherboards, etc.

In some examples, wearable alert system 102 may be enclosed within a form factor suited for wear by a user (and/or affixed to something suited for wear by a user such as a garment or helmet/hat) and real-time operation in one or more activity settings (e.g., athletics, industrial environments, assistive use cases, etc.). In some cases, the housing of wearable alert system 102 may be constructed from lightweight, flexible, and durable materials (e.g., such as silicone rubber, thermoplastic polyurethane (TPU), polycarbonate composites, or medical-grade polymers). In some implementation, the housing may be embedded in or affixed to a fabric-based enclosure, such as one or more elastic bands, adhesive-backed patches, smart textiles, stretchable mesh garments, or other flexible substrates that accommodate body movement. In some cases, wearable alert system 102 may have a form factor matching or similar to a large adhesive bandage, supporting direct skin attachment for applications requiring minimal obtrusion. In some examples, wearable alert system 102 may be integrated into one or more devices, objects, structures, garments, vests, belts, helmets, armbands, wristbands, shoelaces, shoulder straps, custom sports pinnies, etc. The materials selected for a wearable housing, surface, and/or enclosure associated with hardware components 210 may provide moisture resistance, breathability, impact protection, and/or sweat-wicking properties suitable for use in physically demanding scenarios or weather-exposed environments. In some instances, the materials may also include conductive threads or printed circuit elements woven into smart fabric substrates, enabling flexible circuit integration and unobtrusive signal routing within the garment.

In some cases, the material(s) and/or construction(s) of the wearable alert system 102 can be determined based on a use case or application (or set of use cases or applications) of the wearable alert system 102. For example, the wearable alert system 102 can include different versions designed for different use cases or applications. To illustrate, if a version of the wearable alert system 102 is designed for outdoor use or outdoor use cases, the wearable alert system 102 may include an outside or housing material that is waterproof such as flexible films like TPU and polydimethylsiloxane (PDMS), waterproof membranes like expanded polytetrafluoroethylene (cPTFE), protective coatings like silicone or overmolded materials, two-dimensional carbides or carbonitrides, flexible coated medical film tape, PVC, flexible plastics, and/or any other weatherproof material and/or coat. In some cases, the electronic components of the wearable alert system 102 can be protected by a waterproof material and/or coating, and/or can be hermetically sealed to protect them from outdoor elements. In another example, a version of the wearable alert system 102 may be designed for use in impact activities such as impact sports. Such versions of the wearable alert system 102 may be housed in or protected by impact resistant and/or rugged materials, such as elastic polymers, rubber, metal components or foils, polyamide and nylon, impact-resistant plastics (e.g., polycarbonate, polypropylene, nylon, etc.), woven fabric composites, etc. If the version of the wearable alert system 102 is for a more lightweight application, the materials used to construct the wearable alert system 102 can prioritize more lightweight materials.

In some examples, processing device(s) 222 may include one or more processors configured to execute machine-readable instructions stored in a memory/memories of the one or more processors, memory device(s) 234, and/or storage device(s) 232. The one or more processors may include, without limitation, one or more central processing units (CPUs), digital signal processors (DSPs), microcontrollers, field-programmable gate arrays (FPGAs), application-specific integrated circuits (ASICs), neural processing units (NPUs), graphics processing units (GPUs), and/or any other processors or combination thereof. In various configurations, processing device(s) 222 may support functions such as wireless signal acquisition and interpretation, proximity threshold evaluation, motion state classification, directional estimation, device-to-device communication protocol management, sensor data processing, sensor data fusion, presence and/or proximity detection/estimation, object detection and/or recognition, shape detection and/or recognition, scene detection and/or recognition, feedback and/or alert generation, feedback and/or alert decision logic, threshold finetuning, device pairing or tagging, and/or any other functions, operations, and/or actions described herein. In some implementations, processing device(s) 222 may also execute embedded firmware routines responsible for implementing certain functions such as managing sleep cycles, polling intervals, power-saving operations, operating modes, etc.

In some cases, memory device(s) 234 may include volatile memory, non-volatile memory, or a combination thereof. By way of example, memory device(s) 234 may include dynamic random-access memory (DRAM), static RAM (SRAM), magnetoresistive RAM (MRAM), phase-change memory (PCM), or other suitable random-access technologies. In some instances, memory device(s) 234 may cache processing data, parameters, functions, sensor readings, tracking state variables, user interaction logs, compute variables, computed data, and/or any other data for runtime access by processing device(s) 222.

In some examples, storage device(s) 232 may be configured to store longer-term data (e.g., firmware images, preconfigured vibration patterns, protocol configuration settings, AI/ML models, device pairing lists, historical usage logs, software, etc.). In some cases, storage device(s) 232 may be implemented using one or more integrated, coupled, or embedded multimedia cards (cMMC), NAND or NOR flash memory, solid-state storage modules, secure digital (SD) cards, or other types of non-transitory computer-readable media. In some aspects, storage device(s) 232 and memory device(s) 234 may be physically integrated within a single board, integrated circuit, or SoC, or implemented as separate integrated circuits electrically coupled to the processing subsystem. In some cases, portions of the memory hierarchy may be dynamically allocated depending on active mode, operating temperature, or system-level power constraints.

In some aspects, sensor system(s) 224 may include one or more components configured to capture, obtain, and/or generate sensor data such as motion, position, location, orientation, shape, environmental, visual, audio, distance, and/or contextual information relevant to any of the functionalities described herein, such as presence or proximity detection, feedback and alert generation, feedback and alert behavior, etc. In some instances, sensor system(s) 224 may include one or more accelerometers, gyroscopes, magnetometers, IMUs, and/or any other sensors used to track linear acceleration, angular velocity, and/or directional heading, respectively. These inertial signals may be used by processing device(s) 222 to determine a movement state of an associated device or user (e.g., stationary, walking, sprinting, turning, or reversing), estimate device pose, and/or detect motion changes such as impacts or deceleration.

In some instances, sensor system(s) 224 may also include environmental sensors (e.g., barometers for elevation estimation, ambient light sensors, temperature sensors, humidity sensors, etc.), capacitive proximity sensors, optical time-of-flight (ToF) sensors, infrared sensors, ultrasound sensors, RADAR sensors, LIDAR sensors, microphones, impact sensors, etc. These sensors may allow wearable alert system 102 to estimate presence/proximity information, refine proximity thresholds based on deployment context, adjust triggers, etc. For example, barometric pressure changes may signal a change in elevation relevant to multi-level collision avoidance, while ambient light readings may modulate haptic output intensity or polling frequency in dark environments.

In some cases, sensor system(s) 224 may also contribute to power efficiency by acting as trigger sources for activating or suspending one or more subsystems or components, such as wireless communication subsystems. For instance, an IMU may initiate proximity polling upon detecting motion (e.g., thereby reducing energy expenditure during idle states). In some examples, motion data from sensor system(s) 224 may be fused with wireless signal metrics (e.g., channel state information or received signal strength) to enhance the ability of the wearable alert system 102 to determine whether a detected object is approaching, stationary, or moving away. In some cases, any of the sensor data from the sensor systems(s) 224 can be fused or filtered to yield fused or filtered sensor data used for any of the functionalities described herein.

In some examples, communication device(s) 226 may include wireless transceivers configured to transmit and receive wireless signals 242, such as RF signals. The wireless signals 242 can be used for and/or assist in performing presence/proximity detection, peer device communication, interaction with network or computer infrastructure, etc. Communication device(s) 226 may support one or more signaling protocols, including, but not limited to, ultra-wideband (UWB), Bluetooth™ Low Energy (BLE), Wi-Fi Direct, ZigBee®, Z-Wave, near-field communication (NFC), or other short-range or medium-range wireless standards. In some cases, system 102 may dynamically select among supported protocols based on context, energy profiles, or a configuration of the wearable alert system 102.

The communication device(s) 226 may interface with one or more antennas 240, which may include omnidirectional antennas for general spatial coverage, directional patch antennas, or multiple antenna elements arranged in a phased array. In some cases, antenna(s) 240 may be printed on a flexible substrate, embedded within fabric, or integrated into the outer housing of the wearable device. In some instances with multiple antennas 240, communication device(s) 226 may leverage spatial diversity or beamforming techniques to enhance signal quality, reduce multipath interference, and estimate direction-of-arrival (DoA) or angle-of-arrival (AoA) parameters for incoming signals.

In some cases, wireless signal 242 may include one or more wireless signals such as one or more transmitted signals and/or one or more received signals. Wireless signal 242 may be transmitted periodically, in response to a triggering event such as a motion event detected by the sensor system(s) 224, or as part of a time-multiplexed handshake or ranging protocol with other wearable alert systems (e.g., wearable alert system 104 as depicted in FIG. 1). The wireless signal 242 may include a received signal that, upon (or after) being received, can be processed to determine range, time-of-flight, signal strength, multipath components, and/or other spatial metrics. These communication mechanisms allow wearable alert system 102 to evaluate presence/proximity, identify group members, determine relative positions, initiate feedback and/or alert generation/behavior, etc.

In some examples, output device(s) 230 may be configured to generate feedback in response to detected proximity events, motion states, user commands, and/or any other triggering event. Output device(s) 230 may include one or more vibration motors (e.g., eccentric rotating mass (ERM) motors, linear resonant actuators (LRAs), or piezoelectric actuators), visual indicators (e.g., LED arrays or edge-lighting elements or OLED panels), and/or audio generators and/or output devices such as beepers or speakers. In some aspects, feedback may be directional or multimodal, such as stronger haptics on one side of the device based on signal angle of arrival or combined audio-visual cues for redundancy. For instance, a slow vibration pulse may indicate moderate proximity, a flashing light may denote detection of a stationary obstacle, and an escalating vibration or illumination pattern may signal convergence of one or more other wearable alert systems, such as wearable alert system 104 as shown in FIG. 1.

In some aspects, the user interface of wearable alert system 102 may be implemented through the input device(s) 228 and/or output device(s) 230. The input device(s) 228 may include one or more physical toggles, push-buttons, capacitive touch zones, rotary dials, touch-sensitive displays, peripheral input devices, mechanical inputs, microphones, and/or any other input devices that enable the user (e.g., user 110) to configure feedback modes, sensitivity thresholds, device role (e.g., coach, athlete, or worker), alert preferences, parameters, and/or provide any other inputs. In some cases, the user interface may also support gesture input, tap sequences, or long-press behavior for minimal-screen designs. In some examples, wearable alert system 102 may dynamically tailor the alert or feedback output based on one or more preconfigured usage profiles, environmental conditions (e.g., ambient lighting or noise levels), or detected activity patterns, such as walking, sprinting, or standing still.

In some examples, the wearable alert system 102, the hardware components 210, or a portion of the hardware components 210 can be implemented using flexible, bendable, and/or stretchable electronics, which can include wearable electronics, such as, for example and without limitation, a flexible printed circuit(s), a flexible circuit(s), a flexible storage device(s), a flexible integrated circuit(s), flexible cables, a flexible electronic assembly, a flexible display(s), a flexible light-emitting diode(s), one or more flexible batteries, a flexible memory device(s), a flexible solar cell(s), a flexible portable electronic(s), a flexible smart electronic system(s) (e.g., a flexible sensor(s), a flexible processing device(s), a flexible power supply device(s), a flexible memory device(s), etc.), flexible printed wiring, a flexible antenna(s), a flexible sensor(s), and/or any other wearable/flexible electronics. For example, the wearable alert system 102 can include, represent, and/or implement a flexible wearable electronic system, and the hardware components 210 can include a flexible circuit(s) (e.g., a flexible printed circuit(s), a flexible integrated circuit(s), etc.). As another example, the wearable alert system 102 can include, represent, and/or implement a flexible wearable electronic system, and at least some of the hardware components 210 can include flexible wearable electronics such as one or more flexible processing devices, flexible memories, flexible batteries, flexible wiring, flexible sensors, flexible storage devices, flexible antennas, and/or any other flexible electronics.

Figure 3A:
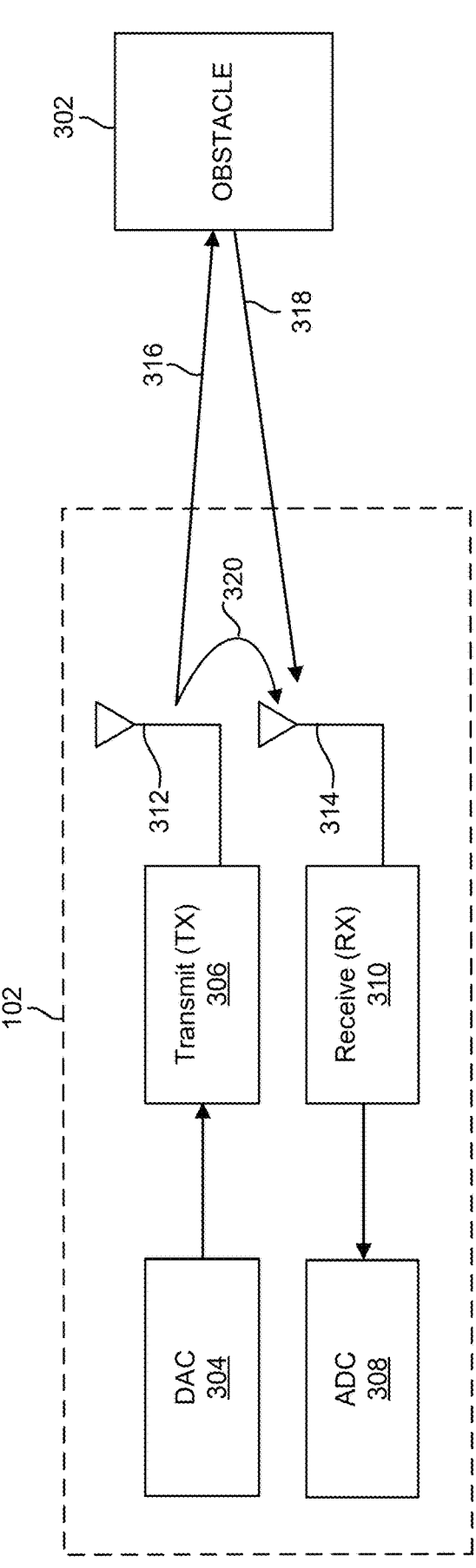
FIG. 3A is a diagram illustrating an example of a wearable alert system using wireless sensing to detect obstacles and/or obstacle characteristics in a surrounding environment, according to some examples of the present disclosure.

FIG. 3A is a diagram illustrating an example of a wearable alert system 102 configured to implement RF sensing techniques to detect the presence of an obstacle 302, according to some examples of the present disclosure. In some examples, wearable alert system 102 may include one or more radio frequency (RF) transmission and reception components configured to emit signals and analyze reflected returns to determine whether an object is within a specified proximity range.

Wearable alert system 102 may also include a digital-to-analog converter (DAC) 304 configured to convert a digital waveform into an analog signal suitable for RF transmission. The analog signal output from DAC 304 may be provided to RF transmitter 306. RF transmitter 306 may be configured to operate using one or more wireless signaling standards, including ultra-wideband (UWB), Bluetooth™ Low Energy (BLE), Wi-Fi, or other RF protocols.

RF transmitter 306 may be electrically coupled to one or more transmission antennas, such as transmit (TX) antenna 312. In some implementations, TX antenna 312 may be an omnidirectional or directional antenna configured to emit RF signals such as proximity pulses or ranging waveforms. These signals may be used to assess the presence, distance, or relative angle of nearby obstacles, tagged devices, or environmental features.

In some examples, wearable alert system 102 may include one or more components configured to receive RF signals. These components may include at least one receive (RX) antenna 314, which may be implemented as an omnidirectional antenna for receiving signals from multiple directions or a directional antenna configured to capture signals from a defined sector. In some configurations, TX antenna 312 and RX antenna 314 may each include multiple antenna elements arranged as an antenna array to enable spatial filtering or direction-of-arrival estimation.

Wearable alert system 102 may also include RF receiver 310 coupled to RX antenna 314. RF receiver 310 may be configured to receive RF signals emitted by wearable alert system 102 or by other nearby devices. In various examples, the RF receiver may be compatible with signaling formats including UWB, BLE, or Wi-Fi. The received analog signal may be passed to an analog-to-digital converter (ADC) 308, which converts the waveform into a digital representation suitable for further analysis and processing by onboard circuitry.

In some scenarios, wearable alert system 102 may implement RF-based proximity sensing by transmitting a signal, such as TX waveform 316, from TX antenna 312. TX waveform 316 may be emitted in an omnidirectional manner or targeted in specific directions using beamforming techniques. In certain cases, the transmitted waveform may be structured to support reliable detection upon reflection, such as through the use of sequences with favorable autocorrelation properties. These signals may enable detection of nearby obstacles based on their reflection characteristics, timing, or amplitude.

In some cases, wearable alert system 102 may perform RF sensing by enabling concurrent transmission and reception of RF signals. For example, wearable alert system 102 may activate RF receiver 310 while RF transmitter 306 transmits TX waveform 316. In some implementations, TX waveform 316 may include a repeated sequence transmitted multiple times to improve detection reliability. Repetition of the waveform may ensure that RF receiver 310 captures complete reflected responses even if reception begins shortly after transmission has started.

By supporting simultaneous transmit and receive operation, wearable alert system 102 can detect both reflected signals (e.g., such as RX waveform 318 returning from obstacle 302) and internal leakage signals, such as TX leakage signal 320 directly coupled from TX antenna 312 to RX antenna 314. In some instances, RX waveform 318 may include multiple repetitions of the transmitted sequence. These can be aggregated by RF receiver 310 to improve signal-to-noise ratio (SNR) and enable more robust obstacle detection.

Although FIG. 3A illustrates a monostatic configuration where transmission and reception occur on the same device, other configurations are also possible. For instance, in a bistatic setup, TX waveform 316 may be transmitted by a separate device, with wearable alert system 102 functioning solely as a receiver. In such configurations, relative positioning or orientation information may be exchanged or inferred to support collaborative RF sensing and accurate proximity estimation.

In some examples, wearable alert system 102 may implement RF sensing techniques by obtaining RF sensing data associated with signals received in response to transmission of TX waveform 316. The RF sensing data may include CSI related to both direct paths (e.g., such as leakage signal 320), and reflected paths (e.g., such as RX waveform 318).

In some aspects, CSI data may include information describing how RF signals propagate between RF transmitter 306 and RF receiver 310. This may account for effects such as multipath scattering, fading, and power decay over distance. In some instances, CSI data may include in-phase (I) and quadrature (Q) components across multiple frequency tones, representing the signal behavior in the frequency domain.

In some examples, wearable alert system 102 may use RF sensing data to estimate properties of detected objects, including distance, angle of arrival (AoA), and trajectory.

For instance, CSI variations may be analyzed to detect motion, determine proximity trends, or identify object characteristics such as position, shape, or relative movement. In some cases, pose estimation techniques (e.g., derived from IMU sensor data) may supplement the RF sensing data to refine directional awareness and proximity evaluation. This integrated analysis may support real-time obstacle detection, group coordination, or adaptive alert generation without relying on visual input or external infrastructure.

In some aspects, the proximity and orientation of an obstacle 302, as determined from RF sensing data, may be used by wearable alert system 102 to selectively activate or deactivate subsystems based on operational context. For instance, if RF sensing indicates that an obstacle is not present within a defined directional field or is moving away, wearable alert system 102 may enter a reduced-power state or suspend nonessential sensing operations. This selective activation may help reduce power consumption in energy-constrained wearable deployments by minimizing active sensing during periods of low environmental interaction. In further examples, wearable alert system 102 may dynamically allocate processing resources based on detected signal density, reflection consistency, or motion state.

In some cases, wearable alert system 102 may determine distance and angle-of-arrival (AoA) corresponding to reflected waveforms such as RX waveform 318 using onboard signal processing logic. These calculations may be implemented using deterministic algorithms (e.g., time-of-flight analysis), machine learning models trained on prior RF response patterns, or a hybrid of both. In some implementations, RF sensing data may be offloaded to an external computing device for additional analysis or aggregation, such as a mobile phone, base station, or server, which may return calculated results for use by wearable alert system 102.

To determine the distance of a reflected signal path, wearable alert system 102 may compare the timing of the leakage signal 320 against the timing of the reflected RX waveform 318. For example, the system may establish a baseline delay from the transmission of TX waveform 316 to reception of leakage signal 320, corresponding to a zero-distance reference. The system may then measure the delay from transmission of TX waveform 316 to reception of RX waveform 318 and subtract the baseline delay to determine a relative distance. This timing-based approach enables wearable alert system 102 to estimate the range to the obstacle 302 that generated the reflected waveform 318.

In some examples, the angle of arrival (AoA) of RX waveform 318 may be determined by analyzing timing differences or phase offsets across multiple elements of a receive antenna array, such as RX antenna 314. By measuring these inter-element differences, wearable alert system 102 may estimate the direction from which the reflected signal originated.

In some instances, wearable alert system 102 may combine distance and AoA information to estimate the relative position of obstacle 302. By identifying the point of signal reflection, the system may determine not only the proximity of the obstacle but also its approximate spatial orientation. In some examples, reflection points from multiple waveforms may be aggregated to estimate the shape or contour of the detected object. Obstacle 302 is described herein for illustrative purposes and may represent any object detectable via RF signal reflection. For instance, obstacle 302 may include a person, a body part, a moving device, an item of equipment, a structure, or any other object present in the physical environment of wearable alert system 102.

In some examples, wearable alert system 102 may be configured to obtain device location data and orientation data in conjunction with RF sensing data. In certain cases, this combined data may be used to adjust or refine estimates of distance and angle of arrival for reflected signals, such as RX waveform 318. For instance, wearable alert system 102 may occupy a first location and orientation when transmitting TX waveform 316, and a different location and orientation when receiving RX waveform 318. The system may correlate these spatial changes (e.g., along with timestamps associated with the RF sensing data) to improve the accuracy of proximity or presence detection for obstacle 302.

In some cases, device position data may be obtained using techniques such as round-trip time (RTT) measurements, passive RF positioning, angle-of-arrival estimation, received signal strength indicator (RSSI) readings, CSI analysis, or a combination thereof. Device orientation data may be captured using onboard sensors such as one or more gyroscopes, accelerometers, compasses, magnetometers, barometers, or other environmental or motion sensors. For example, a gyroscope may track changes in rotational orientation, while a compass may provide absolute directional heading.

Figure 3B:
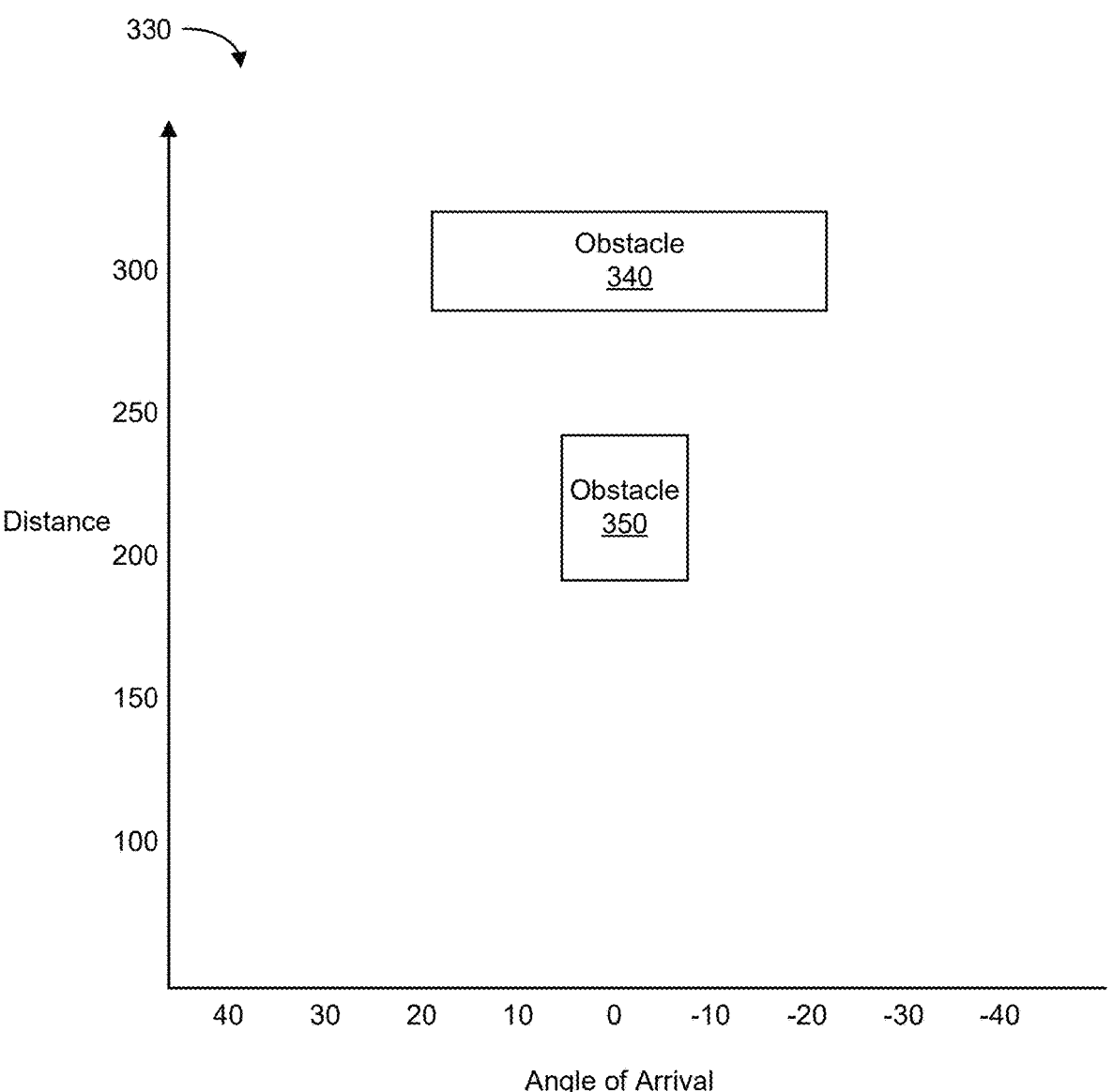
FIG. 3B is a diagram illustrating a graphical representation of distance and angle-of-arrival measurements obtained through wireless sensing performed by a wearable alert system, according to some examples of the present disclosure.

FIG. 3B is a diagram illustrating a graphical representation 330 of distance and angle-of-arrival measurements obtained through RF sensing performed by wearable alert system 102, according to some examples of the present disclosure. As shown, graphical representation 330 includes an x-axis representing the angle of arrival (AoA) of reflected signals in degrees and a y-axis representing the corresponding distance in centimeters. The plotted data may correspond to RF reflections received from one or more objects (e.g., obstacle 350) and nearby environmental features (e.g., obstacle 340 such as a wall, object, person, etc.) encountered by wearable alert system 102. In some cases, wearable alert system 102 may process CSI or time-of-flight measurements to estimate the spatial position of the reflected signals and populate a visual or internal representation such as that shown in graphical representation 330. These measurements may be used to identify the location, orientation, and movement of objects within a detection area and to support context-sensitive alert behavior. In some examples, the system may distinguish between multiple reflection sources (e.g., such as a closer obstacle 350 and a background structure like obstacle 340) based on distance, angle, or reflection strength to prioritize imminent proximity threats.

In some examples, wearable alert system 102 may use the spatial information represented in graphical representation 330 to determine whether proximity conditions are met. For instance, reflections from obstacle 350 may indicate a nearby mobile obstacle, while reflections from wall 340 may represent a static boundary. The system 102 may dynamically adjust alert thresholds or feedback intensity based on the relative position and movement of these objects. In some cases, wearable alert system 102 may suppress alerts for static features like obstacle 340 while escalating feedback when obstacle 350 enters a configured proximity range or angle of approach.

In some instances, wearable alert system 102 may maintain a temporal record of reflected signal data across successive scans, allowing the system to track obstacle 350 over time. Based on changes in angle of arrival and distance measurements, wearable alert system 102 may estimate a velocity, direction of motion, and/or likelihood of collision of obstacle 350. This tracking capability may support anticipatory alerts, such as warning a user of an approaching teammate or equipment in dynamic environments like sports drills or industrial settings.

In some examples, the spatial data derived from RF reflections may be used to generate graphical representations of the environment, including proximity contours or obstacle maps. By way of example, graphical representation 330 may include axes that correspond to azimuth and range, where reflected signal strength or detection probability is plotted over time. This data visualization may be used by wearable alert system 102 locally or shared with external computing devices for team-wide situational awareness, real-time decision support, or post-activity analysis. These techniques may enhance training, safety, and coordination across a range of use cases where environmental awareness is critical.

Figure 4A:
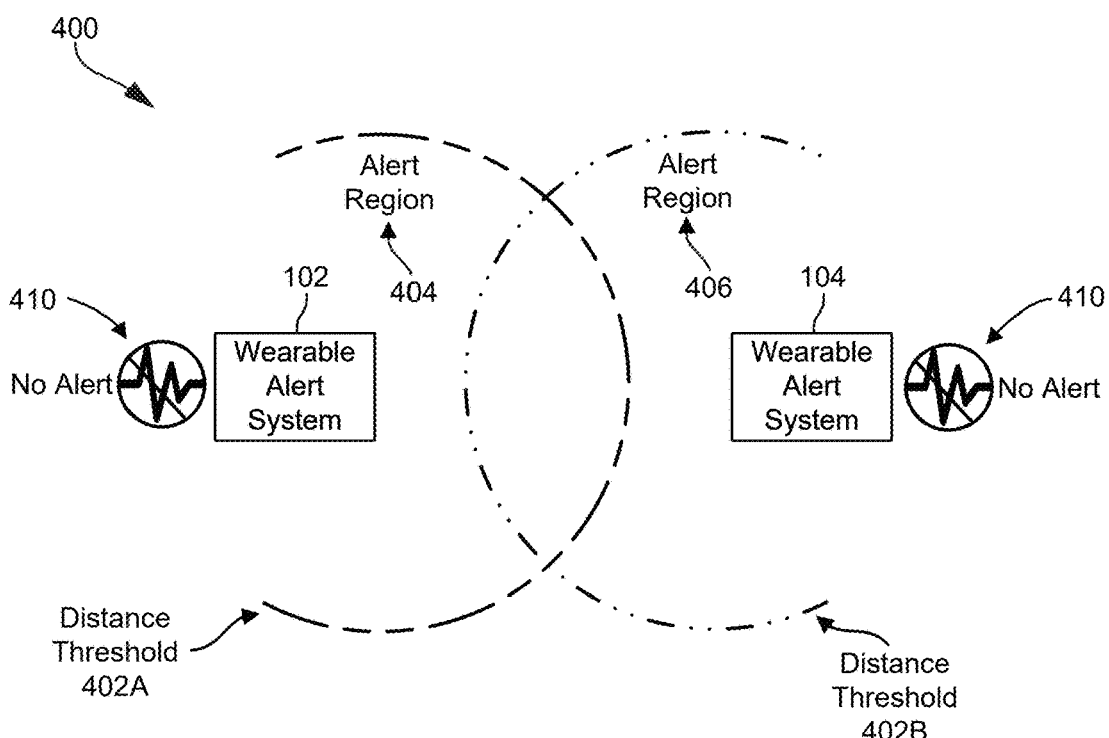
FIG. 4A is a diagram illustrating an example scenario in which two wireless alert systems operate independently and are positioned outside each other's configured alert regions, according to some examples of the present disclosure.

FIG. 4A is a diagram illustrating an example scenario 400 in which wearable alert systems 102 and 104 are positioned outside each other's configured alert regions, according to some examples of the present disclosure. As shown, wearable alert system 102 is associated with alert region 404 and wearable alert system 104 is associated with alert region 406. Alert regions 404 and 406 are shown in FIG. 4A as dashed zones extending outward from wearable alert systems 102 and 104, respectively. These alert regions may represent configurable spatial boundaries determined based on respective distance thresholds. For example, alert region 404 of wearable alert system 102 is based on distance threshold 402A of wearable alert system 102, and alert region 406 of wearable alert system 104 is based on distance threshold 402B of wearable alert system 104.

In some cases, the distance thresholds 402A-B (collectively "distance thresholds 402" hereinafter) of wearable alert systems 102 and 104, respectively, may be the same (e.g., may be set to the same distance parameter, metric, value, measurement, range, unit, etc.). In other cases, the distance thresholds 402 can be different distance thresholds. For example, the distance threshold 402A of wearable alert system 102 may be different than the distance threshold 402B of wearable alert system 104. The distance thresholds 402 may be different based on one or more factors such as, for example, user preferences, user roles, device modes, device roles, learned parameters (e.g., learned by one or more AI/ML models), one or more conditions, device states, and/or any other factors.

In FIG. 4A, wearable alert system 102 is outside of alert region 406 of wearable alert system 104, and wearable alert system 104 is outside of alert region 404 of wearable alert system 102. In other words, the distance between wearable alert system 102 and wearable alert system 104 is greater than the distance threshold 402A of wearable alert system 102, which defines alert region 404 of wearable alert system 102, and greater than distance threshold 402B of wearable alert system 104, which defines alert region 406 of wearable alert system 104.

Each of the distance thresholds 402 may be static or dynamically adjustable parameters defining the maximum distance from a respective wearable alert system within which a presence of another tagged or compatible system will trigger a proximity alert. In some cases, any of the distance thresholds 402 may be adjusted based on one or more factors such as, for example, user activity, an environmental factor(s), a context(s), a predefined operational mode(s), an energy-saving strategy, a user input(s) and/or preference(s), an AI/ML model(s), a condition(s), an associated use case, and/or any other factor. For illustration and explanation purposes, alert regions 404 and 406 are shown in FIG. 4A as having a circular shape. However, in other examples, alert region 404 and/or alert region 406 may have or represent any other shape, such as an elliptical shape, an asymmetric shape/pattern, or any other shape. The shape and coverage of alert regions 404 and 406 depend on the distance thresholds 402. In some cases, the shape and coverage of alert regions 404 and/or 406 can additionally depend on one or more additional factors such as, for example, a respective device antenna geometry and/or directionality, configurable coverage maps, and/or any other factors.

As illustrated in FIG. 4A, wearable alert system 102 is positioned outside of alert region 406 of wearable alert system 104, and wearable alert system 104 is positioned outside of alert region 404 of wearable alert system 102. In this spatial configuration, wearable alert system 102 is not within alert region 406 of wearable alert system 104 (and thus is outside of distance threshold 402B of wearable alert system 104), and resides wearable alert system 104 is not within alert region 404 of wearable alert system 102 (and thus is outside of distance threshold 402A of wearable alert system 102. As a result, wearable alert systems 102 and 104 may both determine that no proximity event has occurred, and both wearable alert systems 102 and 104 remain in a no-alert state 410. The no-alert state 410 is illustrated in FIG. 4A by graphical indicators positioned near each respective system, indicating that no haptic, auditory, or visual feedback/alert is currently being triggered or generated.

The spatial configuration shown in FIG. 4A may correspond to scenarios in which individuals equipped with wearable alert systems (e.g., 102 and/or 104) are situated beyond their respective alert regions (e.g., safety or interaction zones), such as teammates spaced apart beyond the distance thresholds 402 during athletic drills, workers assigned to separate operational zones in an industrial setting where such zones are beyond the distance thresholds 402, individuals navigating through an environment without intersecting trajectories and beyond the distance thresholds 402, etc. In some aspects, each wearable alert system may operate independently to monitor for proximity signals emitted by the other wearable alert system (and any other tagged or paired system), and to evaluate separation distance based on proximity detections. The proximity detections can be based on sensor data such as ultrasound sensor data, radio detection and ranging (RADAR) sensor data, light detection and ranging (LIDAR) sensor data, time-of-flight (TOF) sensor data, infrared sensor data, and/or any other sensor as further described herein. In some cases, the proximity detections can additionally or alternatively be based on wireless signal metrics such as signal strength, time-of-flight, and/or angle-of-arrival (AoA). In some cases, as long as no other wearable alert system is detected within the distance thresholds 402, each of the wearable alert systems 102 and 104 may remain in the no-alert state 410, which can include an idle state with respect to alert output, generation, triggering, etc. While in the no-alert state 410, the wearable alert systems 102 and 104 can conserve energy, avoid unnecessary feedback generation, etc.

In some examples, distance thresholds 402 may be configured to reflect contextual parameters, such as a user role (e.g., an athlete versus a coach, a student versus a teacher, an administer versus another user, a parent versus a child, etc.), an operational mode (e.g., training session versus live engagement), an environmental constraint (e.g., a narrow corridor versus an open field, an urban region with dense traffic versus a rural region with less traffic, etc.). In some cases, the wearable alert systems 102 and 104 can remain in a passive standby state when no proximity condition is met, which may support adaptive and energy-efficient operation while retaining readiness to issue alerts when triggering interactions occur (e.g., threatening interactions where a distance threshold is breached).

Figure 4B:
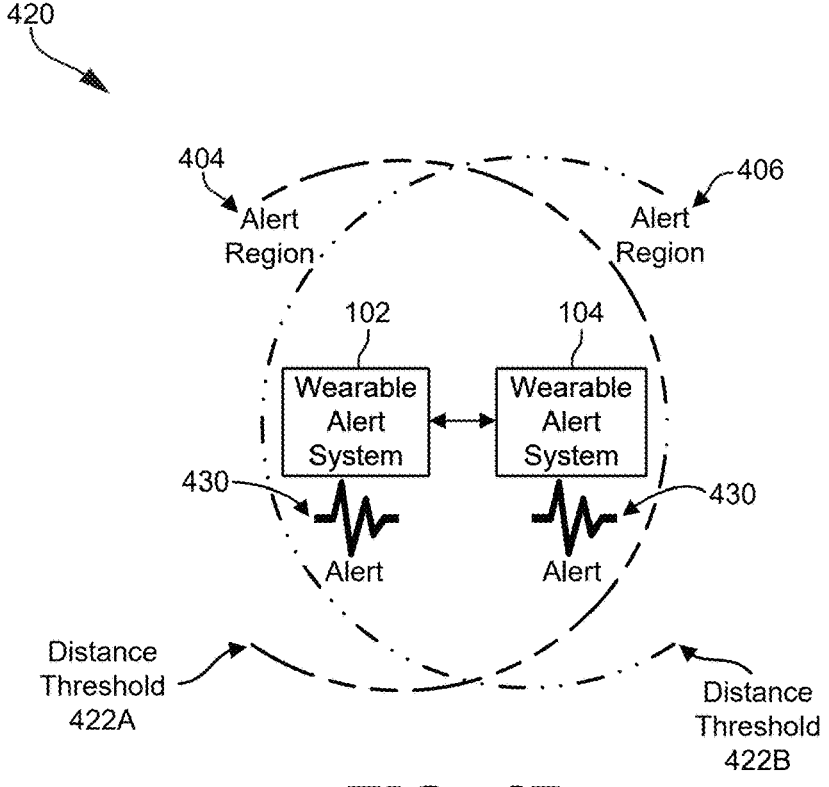
FIG. 4B is a diagram illustrating an example scenario in which two wireless alert systems are positioned within the other's configured alert regions, according to some examples of the present disclosure.

FIG. 4B is a diagram illustrating an example scenario 420 in which wearable alert systems 102 and 104 are each positioned within the other's configured alert regions, according to some examples of the present disclosure. In this example, the spatial relationship between wearable alert systems 102 and 104 satisfies the proximity condition defined by the distance thresholds 422A and 422B (collectively "distance thresholds 422" hereinafter) of wearable alert systems 102 and 104, respectively. As depicted, wearable alert system 102 is located within alert region 406 of wearable alert system 104, and wearable alert system 104 is located with alert region 404 of wearable alert system 102. For example, wearable alert systems 102 and 104 both reside within the intersection of alert regions 404 and 406 (e.g., illustrated by the overlapping portions of the dashed circular zones representing alert regions 404 and 406). Since wearable alert system 102 is located within alert region 406 of wearable alert system 104 and wearable alert system 104 is located with alert region 404 of wearable alert system 102, the proximity between wearable alert system 102 and wearable alert system 104 is less than the distance thresholds 422, which triggers an alert state 430 (e.g., a proximity-based alert condition).

The alert state 430 of both wearable alert systems 102 and 104 can trigger wearable alert systems 102 and 104 to generate respective alerts. The alerts can include, for example and without limitation, haptic feedback (e.g., vibration), visual feedback (e.g., light emitted by a light emitting device, such as a light-emitting diode (LED), visual data displayed on a display device such as a screen, etc.), auditory signals (e.g., sound or noise such as a sound alarm output by a speaker device, a verbal message output by a speaker device, etc.), and/or any other type of alert(s). In some cases, wearable alert systems 102 and 104 can communicate with each other (e.g., exchange data) irrespective of whether wearable alert system 102 is within the alert region 406 of wearable alert system 104 or whether wearable alert system 104 is within alert region 404 of wearable alert system 102. In other cases, the proximity condition may (e.g., wearable alert system 102 being within alert region 406 of wearable alert system 104 and thus breaching distance threshold 422B, and/or wearable alert system 104 being within alert region 404 of wearable alert system 102 and thus breaching distance threshold 422A) trigger data exchange between wearable alert systems 102 and 104, such as identification handshakes, user role verification, alert exchanges and/or prioritization information, notifications, and/or any other data. In FIG. 4B, wearable alert systems 102 and 104 are in communication with each other, as illustrated by the bidirectional communication arrow extending between wearable alert systems 102 and 104.

Figure 4C:
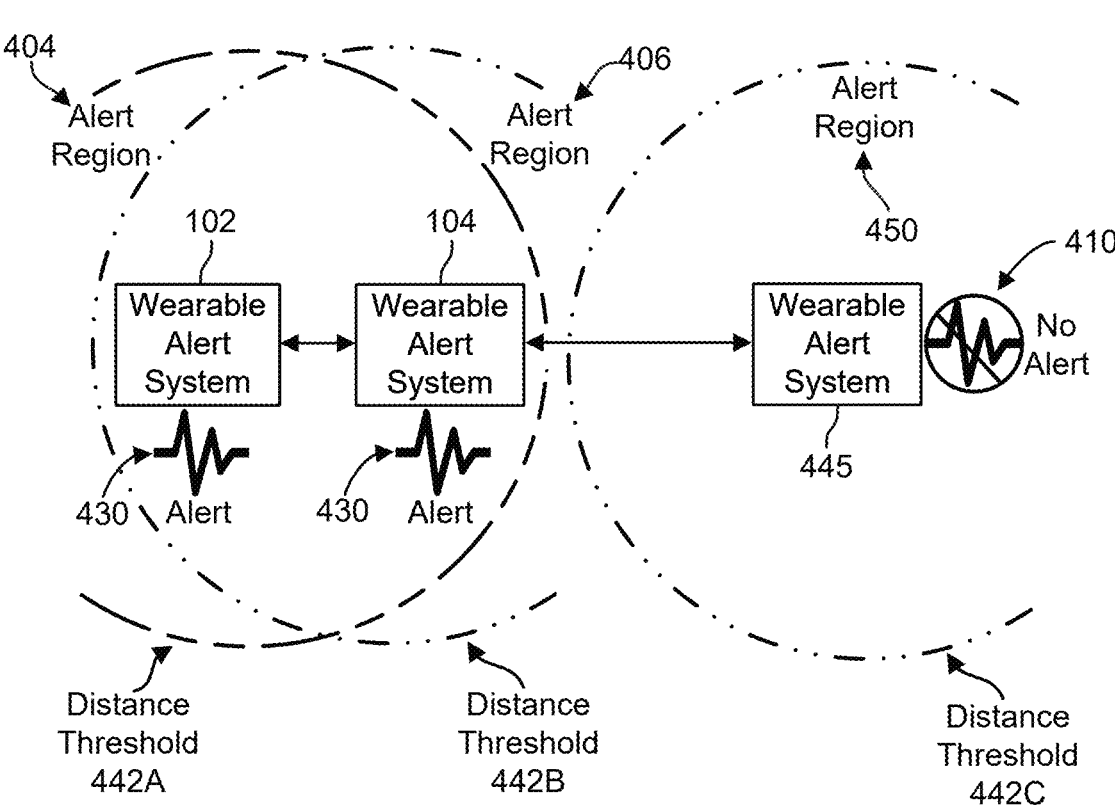
FIG. 4C is a diagram illustrating an example scenario with three wearable alert systems, each associated with respective alert regions and a common proximity distance threshold, according to some examples of the present disclosure.

FIG. 4C is a diagram illustrating an example scenario 440 including three wearable alert systems 102, 104, and 445 with respective alert regions 404, 406, and 450, according to some examples of the present disclosure. The wearable alert systems 102, 104, and 450 implement distance thresholds 442A-C (collectively "distance thresholds 442" hereinafter) used to trigger certain behaviors based on proximity determinations, such as alerts and/or any other behaviors. For example, wearable alert system 102 is configured to implement distance threshold 442A, wearable alert system 104 is configured to implement distance threshold 442B, and wearable alert system 445 is configured to implement distance threshold 442C. In some cases, the distance thresholds 442A, 442B, and 442C can be the same such that the wearable alert systems 102, 104, and 450 have a common distance threshold. In other cases, two or all of the distance thresholds 442A, 442B, and 442C can be different such that one or more of the wearable alert systems 102, 104, and 450 have different distance thresholds.

Wearable alert systems 102, 104, and/or 445 can exchange signals used to detect relative proximities, such as proximity signals. In FIG. 4C, wearable alert systems 102 and 104 are depicted as being engaged in bidirectional communications. Moreover, in FIG. 4C, wearable alert system 102 is within the alert region 406 of wearable alert system 104 and wearable alert system 102 is within the alert region 404 of wearable alert system 102. Thus, wearable alert systems 102 and 104 are positioned within each other's alert regions (e.g., alert regions 404 and 406, respectively). Since wearable alert systems 102 and 104 are positioned within each other's alert region, wearable alert systems 102 and 104 have registered/triggered a proximity alert condition and are in an alert-state 430. By contrast, wearable alert system 445 is located outside of alert region 404 of wearable alert system 102 and alert region 406 of wearable alert system 104, and wearable alert systems 102 and 104 are outside of alert region 450 of wearable alert system 445. Thus, wearable alert system 445 is in a no-alert state 410.

In some cases, if an alert state is triggered at a wearable alert system(s) (e.g., because the wearable alert system(s) has/have detected a presence of one or more other wearable alert systems within a respective alert region of such wearable alert system(s) and thus within a respective distance threshold(s)), the alert state can trigger that wearable alert system(s) to communicate information, such as signals or alerts, to the other wearable alert system(s) (e.g., the wearable alert system(s) that is/are within the alert region(s) of the wearable alert system(s)) and/or implement a communication pattern in communications with the other wearable alert system(s) (e.g., increase a frequency and/or other characteristic of any signals exchanged between the wearable alert systems). In some cases, wearable alert systems 102, 104, and 450 can communicate information, such as signals and/or any data, irrespective of whether any of the wearable alert systems 102, 104, and 450 is/are in an alert state (e.g., irrespective of whether any wearable alert system is within an alert region of any other wearable alert system).

For example, in FIG. 4C, despite not meeting a proximity alert condition, wearable alert system 445 is illustrated as communicating with wearable alert system 104, as shown by an arrow between wearable alert system 104 and wearable alert system 445). In some examples, wearable alert system 104 and wearable alert system 445 may be configured to communicate when wearable alert system 104 and wearable alert system 445 are within a communication range or a threshold distance that may optionally exceed the distance threshold 442B and/or the distance threshold 442C. In some cases, wearable alert system 445 may communicate with wearable alert system 104 even though wearable alert system 104 is not within alert region 450 of wearable alert system 445 (and vice versa) because wearable alert system 445 is operating in a supervisory, broadcast, administrator, or coordination mode (e.g., a coach device configured to send drill instructions to selected player devices, a teacher device configured to send information to student devices, an administrator system overseeing user interactions without generating local alerts, etc.).

In some instances, communication links, channels, and/or exchanges between wearable alert systems may support control commands, status updates, telemetry, alerts, instructions, handshakes, coordination information (e.g., prioritization, alert coordination, alert pattern coordination, alert timing coordination, role coordination, etc.), device role coordination and/or verification, sensor data exchanges, probe signal exchanges (e.g., wireless signal exchanges, etc.), and/or any other information/signal independent of real-time proximity-based alert logic. In some examples, wearable alert system 445 can maintain communication with other systems, such as wearable alert system 102 and/or wearable alert system 102, even when wearable alert system 445 is outside of alert region 406 of wearable alert system 104 (and thus outside of distance threshold 442B of wearable alert system 104) and alert region 404 of wearable alert system 102, and wearable alert systems 102 and 104 are outside of alert region 450 of wearable alert system 445 (and thus outside of distance threshold 402C of wearable alert system 445). This can enable use cases where a user associated with wearable alert system 445 has a certain role, such as a coach, an observer, a supervisor, an administrator, a referee, etc., where the wearable alert system of such user may want or need connectivity with other wearable alert systems without generating alerts for the user (e.g., as shown by the no-alert state 410 of wearable alert system 445).

Figure 5A:
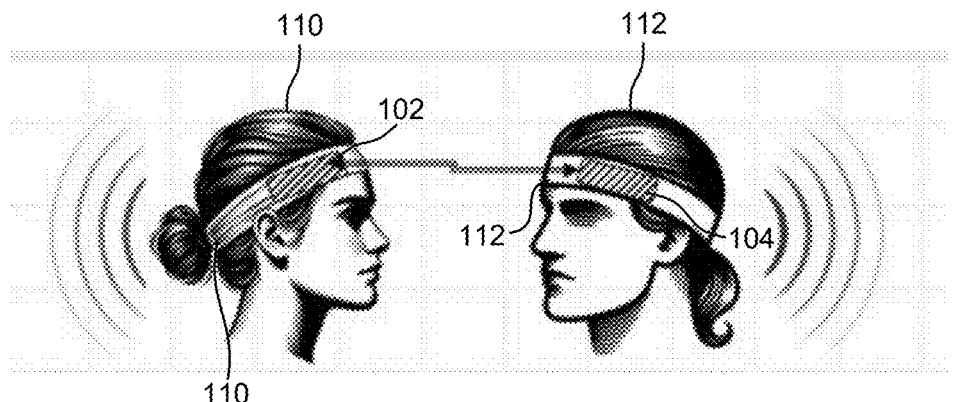
FIGS. 5A through 5C are diagrams illustrating example scenarios of users wearing respective wearable alert systems, according to some examples of the present disclosure.

FIG. 5A is a diagram illustrating example implementations of wearable alert systems 102 and 104 as worn by user 110 and user 112, respectively. In this illustration, wearable alert systems 102 and 104 are integrated into headband-style form factors configured to be worn on the user's head, forehead, or upper head region. The depicted configuration highlights an example use case in which proximity detection functionality is incorporated into athletic, assistive, or training environments through lightweight, unobtrusive wearables.

In some examples, each wearable alert system 102 and 104 may be embedded within or attached to an elastic or fabric-based headband worn by the user (e.g., user 110, user 112). These headband implementations may house internal components such as RF transceivers, antennas, sensor modules, haptic actuators, and/or embedded control logic, as described above with respect to FIG. 2. In some aspects, the wearable alert systems may operate autonomously or in tandem, transmitting and receiving proximity signals to determine when distance thresholds are crossed, and generating alerts such as vibration, audible tones, or visual cues in response to proximity or motion events.

As depicted in FIG. 5A, wearable alert system 102 worn by user 110 and wearable alert system 104 worn by user 112 may be configured to establish a direct communication link between the two systems based on signal strength, signal directionality, and proximity sensing thresholds. In some examples, this interaction may enable real-time feedback to support collision avoidance, training coordination, team-based drills, or safety enforcement. Although illustrated as headbands in this example, wearable alert systems 102 and 104 may be implemented in other form factors or mounted on other parts of the body or equipment, depending on application-specific requirements.

Figure 5B:
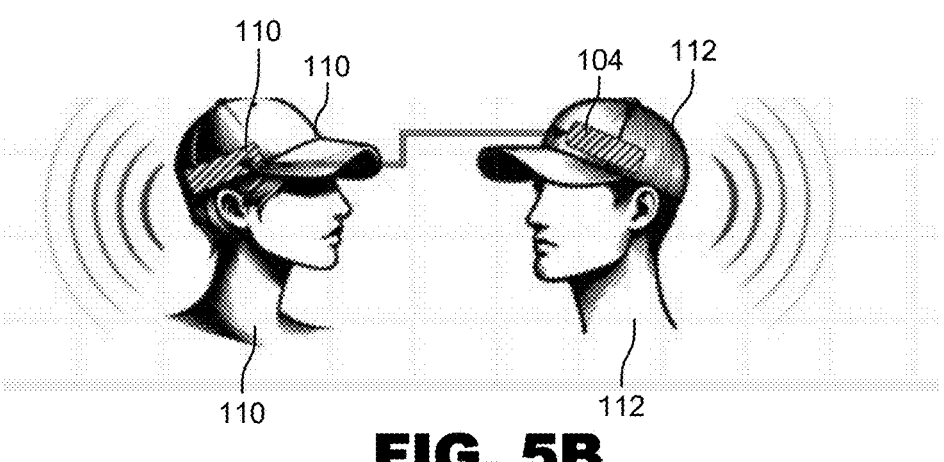

FIG. 5B is a diagram illustrating another example implementation of wearable alert systems 102 and 104 as worn by a user 110 and a user 112, respectively. In this example, wearable alert systems 102 and 104 are integrated into the front panels or brims of wearable headgear, such as baseball caps. This implementation may be suitable for outdoor environments, athletic training, or field-based activities, allowing unobtrusive integration of RF sensing components while maintaining comfort and usability. Similar to prior examples, wearable alert systems 102 and 104 may communicate to detect proximity conditions and trigger alert outputs based on configured thresholds.

Figure 5C:
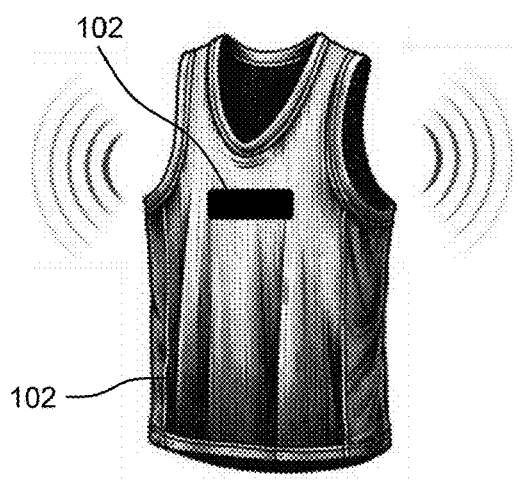

FIG. 5C is a diagram illustrating an example implementation of wearable alert system 102 worn by a user 110. As depicted, FIG. 5C is an example implementation of wearable alert system 102 integrated into a garment, such as a pinnie, athletic jersey, or other wearable article. In this embodiment, wearable alert system 102 may be embedded within or affixed to the front panel of the garment, allowing RF sensing functionality to be incorporated directly into clothing worn during physical activities. In some examples, this configuration may be suitable for use in team sports, training drills, construction vests, medical scrubs, or other occupational settings where body-worn alerts are beneficial. The garment may include conductive threads, flexible substrates, or secure mounting zones to accommodate embedded electronics while preserving comfort, mobility, and washability.

Figure 6:
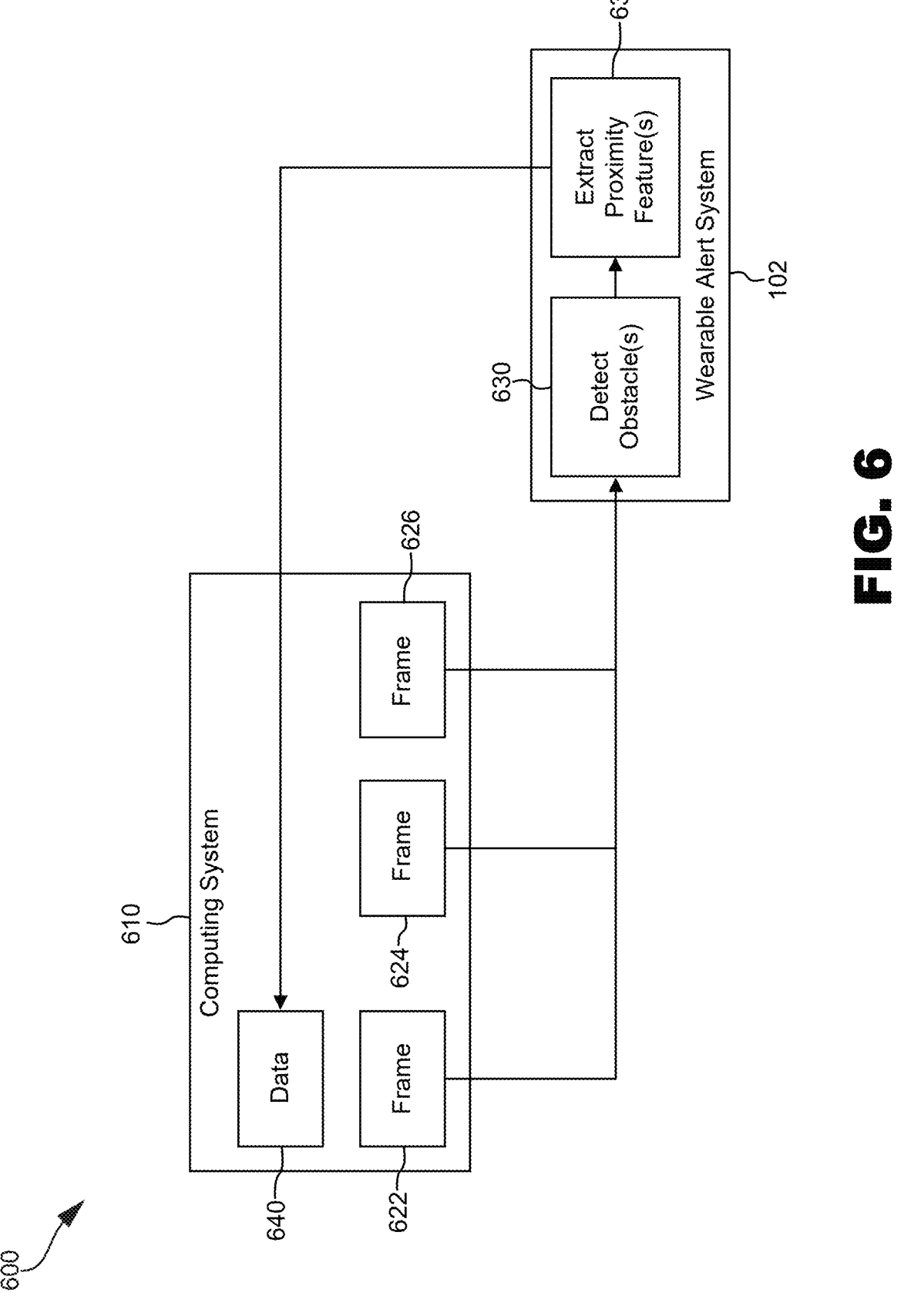
FIG. 6 is a diagram illustrating an example use case in which a wearable alert system uses wireless sensing to detect obstacles and determine proximity features, according to some examples of the present disclosure.

FIG. 6 illustrates an example use case 600 in which a wearable alert system 102 uses RF sensing to detect obstacles within a threshold proximity, according to some examples of the present disclosure. In some examples, the uplink traffic may include proximity-related features derived from RF-based detection. Computing system 610 may part of wearable alert system 102 or a separate system such as any of the computing devices 120. In some examples, computing system 610 can use the received data to assess obstacle proximity, movement patterns, spatial context, and/or any other presence, proximity, distance, position, and/or location information relative to the wearable alert system 102 (and thus the associated user).

As shown, computing system 610 may transmit downlink (DL) data frames 622, 624, and 626 to wearable alert system 102 using a supported wireless communication protocol. Wearable alert system 102 may analyze the DL data frames to perform RF sensing and detect obstacles within a threshold proximity that may cause signal reflections. In some cases, wearable alert system 102 may extract channel state information (CSI) from the DL data frames to identify signal reflection characteristics, such as azimuth, elevation, and distance of the reflected signal paths, thereby enabling estimation of the reflector's position, shape, or size in the surrounding environment.

Wearable alert system 102 may perform object detection 630 to estimate the location of nearby obstacles (e.g., object, person, animal, structure, etc.) based on the reflection characteristics derived from received RF signals. For instance, wearable alert system 102 may determine azimuth, elevation, and time-of-flight (TOF) of reflected paths to compute a three-dimensional (3D) position of an obstacle in the surrounding environment.

Wearable alert system 102 may use the estimated location of an obstacle to isolate and extract proximity features 632. Wearable alert system 102 may transmit the proximity features 632 to computing system 610 using an uplink (UL) data frame 640.

In some configurations, wearable alert system 102 may support multi-link operation (MLO) and perform RF sensing using Wi-Fi radar techniques. For example, wearable alert system 102 may transmit Wi-Fi sounding signals over one communication link to gather channel state information (CSI), while concurrently maintaining normal DL/UL data exchange over another link to minimize added airtime overhead. In instances where MLO is not supported, wearable alert system 102 may extend its Wi-Fi active window slightly—such as at the beginning or end of a transmission opportunity—to accommodate Wi-Fi radar activity without significantly impacting performance.

In some cases, wearable alert system 102 may perform RF sensing using a single received data frame to construct a snapshot of the surrounding environment. Alternatively, the system may utilize multiple sequentially received frames to enhance detection granularity and spatial resolution, for example by aggregating CSI derived from existing downlink data traffic.

FIG. 7 is a flowchart illustrating an example process 700 for performing proximity detection using a wearable alert system, according to some examples of the present disclosure.

At block 702, the process 700 can include obtaining, by a wearable alert system (e.g., wearable alert system 102) sensing data based on one or more wireless signals. The one or more wireless signals can include one or more RF signals, reflected RF signals, light signals, and/or any other signal. The sensing data can include a proximity and/or distance measurement(s), a presence detection measurement(s), a position measurement(s), a location measurement(s), a motion measurement(s), and/or any other measurement described herein.

In some examples, the wearable alert system may transmit an outbound RF signal using a wireless transceiver and receive one or more reflected signals reflected from one or more obstacles such as one or more objects, humans, devices, animals, structures, wearable systems, trees, etc. The one or more reflected signals may include multipath components originating from physical structures or bodies in the environment, such as obstacle 302 shown in FIG. 3A, obstacle 350 shown in FIG. 3B, or obstacle 340.

In some examples, the sensing data may include channel state information (CSI), received signal strength indication (RSSI) information, time-of-flight (ToF) information, angle-of-arrival (AoA) information, other wireless-derived metadata calculated based on the timing, phase, or spatial properties of the one or more wireless signals, and/or information used to calculate any of such information. In some instances, the one or more wireless signals may be used to estimate relative positioning between the wearable alert system (or an associated user) and another system (e.g., wearable alert system 104) and/or obstacle. In some cases, the one or more wireless signals can be used to detect passive reflectors such as walls or untagged objects in the environment. In various implementations, the sensing data may be captured using a monostatic setup, where the same wearable alert system transmits and receives one or more wireless signals, or a bistatic setup where another wearable alert system or infrastructure node acts as the transmitter.

In some aspects, sensing data obtained at block 702 may correspond to reflections received from within a designated alert region (e.g., alert region 404 or 406 in FIG. 4), and may be used to infer the spatial presence of other nearby systems or physical boundaries such as a wall or barrier. These reflections may help the system assess whether another system or obstacle has entered a proximity threshold, as further described herein.

At block 704, the process 700 can include determining, by the wearable alert system based on the sensing data, a spatial relationship between the wearable alert system (or an associated user) and a source of the one or more wireless signals. In some examples, this may include estimating a direction, distance, or relative position between a wearable alert system 102 and another apparatus or obstacle (e.g., obstacle 302, obstacle 350, wearable alert system 104, user 112, etc.) that transmitted or reflected the one or more wireless signals. The spatial relationship may be defined in terms of one or more geometric or physical attributes, such as angular bearing, radial distance, or three-dimensional displacement vector relative to the local frame of reference of wearable alert system 102.

In some cases, the sensing data can include data indicating that the wearable alert system received or detected the one or more wireless signals and/or that the one or more wireless signals received or detected correspond to the source of the one or more wireless signals. Moreover, determining the spatial relationship can be based on a determination (e.g., based on the sensing data) that the wearable alert system received or detected one or more wireless signals from the source of the one or more wireless signals. In some cases, determining the spatial relationship can also be based on a determination of a characteristic of the one or more wireless signals detected/received by the wearable alert system, such as a signal strength.

In some cases, the spatial relationship may be inferred from one or more signal characteristics of or in the sensing data. For instance, the angle-of-arrival (AoA) of a wireless signal may be computed using a multi-element antenna array (e.g., via phase shift differences across RX elements 314 in FIG. 3A). Similarly, time-of-flight (ToF) or round-trip delay may be used to estimate the range from the wearable alert system to the source of the one or more wireless signals (e.g., a transmitting source or a reflecting source). In some cases, signal strength (e.g., RSSI) may be factored in to resolve ambiguities or support coarse distance estimation when ToF resolution is limited. These metrics may be used individually or fused using sensor fusion techniques (e.g., combining inertial measurements or motion state data) to improve robustness across different scenarios. By way of example, wearable alert system 102 may determine that a signal reflected off obstacle 302 originated from a distance of approximately 1.2 meters at a 30-degree azimuth relative to the device's forward axis. In other cases, the one or more wireless signals may be determined to originate from another wearable alert system 104 (as illustrated in FIG. 4B). The one or more wireless signals allow the wearable alert systems to establish a peer-to-peer spatial awareness model.

In some cases, wearable alert system 102 may process the sensing data in real time to maintain a continuously updated map of nearby obstacles (e.g., obstacles of interest such as users, devices, objects, etc.), track changes in their position or movement, and assess whether any of them are converging toward or diverging from the wearable alert system. This tracking capability may trigger proximity-based responses or alerts based on user movement, as described further below in connection with block 706.

At block 706, the process 700 can include determining, by the wearable alert system, whether the spatial relationship satisfies a proximity condition associated with a distance threshold. In some cases, the spatial relationship determined at block 704 may be compared against a predefined or dynamically adjustable threshold to evaluate whether an obstacle (e.g., user, object or device) is considered in proximity to or within a proximity of the wearable alert system. The proximity condition may be defined in terms of a threshold, minimum, and/or maximum allowable distance between the wearable alert system and the source of the one or more wireless signals. In some configurations, angular constraints may be applied, such as requiring the reflection to fall within a directional sector relative to the device's orientation.

In some instances, the distance threshold may be set statically (e.g., by the user or a default profile) or may be adjusted in dynamically, in real-time, or at any point. The threshold can be adjusted based on operational context, user motion, an environmental condition, a user preference, etc. For instance, during a sports training session, the threshold may be widened to detect players (or associated devices) entering a broader interaction zone, whereas in a confined industrial setting, the threshold may be narrowed to limit alerts to immediate collision risks. Context-aware adjustments may be based on an inferred motion state from sensor data (e.g., accelerometer data, gyroscope data, etc.), enabling tighter thresholds while stationary and more lenient ones during dynamic motion. The outcome of this comparison may be a Boolean or confidence score used to trigger feedback responses at block 708.

At block 708, the process 700 can include triggering, by the wearable alert system based on a determination that the spatial relationship satisfies the proximity condition (e.g., a determination that the wearable alert system and the source of the one or more wireless signals are within the distance threshold), a sensory alert via one or more output components. In some cases, triggering the sensory alert can include activating one or more haptic, visual, and/or auditory devices integrated into the wearable alert system. For example, upon determining that the spatial relationship between wearable alert system and the source of the one or more wireless signals (e.g., another wearable alert system, a computing device, an electronic device, etc.) satisfies the proximity condition, a vibration motor may emit a vibration pattern which may or may not depend on an estimated range or angle of approach of the source of the one or more wireless signals relative to the wearable alert system. The vibration may increase in frequency or intensity as the distance decreases or vary directionally based on angle-of-arrival information derived from the sensing data.

In some instances, the sensory alert can additionally or alternatively include illumination of one or more visual indicators, such as LEDs or OLED, to provide intuitive proximity feedback and/or presence alerting. The visual indicators may emit light, flashing signals, and/or color-coded signals depending on estimated proximity, a movement trajectory, a speed or velocity, an estimated time of arrival or collision, etc. In some cases, the sensory alert may additionally or alternatively include an auditory alert. The auditory alert, such as a beep or tone (or pattern thereof), may be used in environments where haptic or visual cues are insufficient, in situations where auditory alerts are preferred, or in combination with visual and/or haptic alerts. In some configurations, the triggered alert may be context-aware. For example, the alert may be tailored according to a user role (e.g., athlete, coach, visually impaired user), activity mode (e.g., training vs. live event) of a user associated with the wearable alert system (e.g., wearing the wearable alert system), an environment (e.g., loud industrial floor vs. quiet indoor facility), an activity, a risk, a weather condition, a noise condition, etc. The wearable alert system may optionally suppress or escalate alerts based on one or more factors such as, for example, an alert history, override states, external, user preferences, estimated probabilities of collision, a confidence score of a proximity sensing result or measurement, etc.

In some cases, the type, magnitude, and/or characteristics of the sensory alert generated by the wearable alert system can depend on environmental factors such as, for example and without limitation, ambient light levels, sound/noise levels, impact and/or shock events, motion levels, etc. For example, if the wearable alert system determines (e.g., via a sensor such as an ambient light sensor) that the ambient levels are above a threshold (e.g., indicating a bright environment with light intensity levels above a threshold), the wearable alert system may avoid using a visual alert signal (or supplement the visual alert signal with another type of signal) as the user may not be able to adequately see the visual alert signal given the ambient light levels. Instead, the wearable electronic device may use an audio and/or haptic feedback alert signal. If the ambient levels are instead below a threshold indicating low ambient light levels (e.g., a dark environment), a visual alert signal may be more noticeable to a user. Thus, the wearable alert system may use a visual alert signal in such scenarios (instead of or in addition to other signals). If the wearable alert system determines (e.g., via a microphone) that the noise levels in the environment are above a threshold, the wearable alert system may avoid using audio alert signals (or may supplement such signals with other type of signals) as the audio alert signals may be less perceptible to the user in such noisy environments. By contrast, if the noise levels are below a threshold, the audio alert signals may be more noticeable to the user. In such cases, the wearable alert system may use audio alert signals to provide feedback to the user.

If the wearable alert system is used in an impact activity, such as an impact sport, haptic alert signals may be less noticeable to the user. In such cases, the wearable electronic device may detect (e.g., via a shock, impact, and/or force sensor) a threshold amount and/or magnitude of impact/shock events and determine to avoid using haptic feedback signals (or supplement such signals with other types of signals) during the period with the threshold amount and/or magnitude of impact/shock events as haptic feedback signals may be less noticeable to the user when the user is experiencing other impact/shock events/stimuli. If the wearable alert system subsequently detects that the impact/shock events are below a threshold magnitude and/or frequency, the wearable alert system may switch to using haptic feedback alerts (or continue using haptic feedback alerts and stop using other types of supplementary signals/alerts).

In some cases, the process 700 and/or the processing capabilities, alert logic, sensing capabilities (e.g., detection/recognition capabilities, sensor data interpretation, etc.), and/or any other features of the wearable alert system (e.g., wearable alert system 102) described herein may be implemented in software and/or firmware. This can enable third-party platforms to implement the process 700 and/or any of the processing capabilities, alert logic, sensing capabilities, and/or any other features described herein. The third-party platforms can include any third-party device and/or compute environment such as, for example and without limitation, third-party smart glasses, earbuds, head-mounted displays (HMDs), wearable electronic devices, laptop computers, mobile phones, tablet computers, electronic tools, autonomous systems, electronic bicycles, electric scooters, motorcycles, virtual reality and/or augmented reality devices, portable electronic devices, and/or any other electronic device.

Moreover, the wearable electronic device may implement software used to process sensor data, use the sensor data to make various determinations and/or generate sensing outputs, aggregate sensor data, filter sensor data, use sensor data to make predictions, etc. In some cases, the wearable electronic device can use AI/ML software to process sensor data and/or generate outputs based on sensor data (and optionally other data) such as, for example, an object detection model, a recognition model, a presence detection and/or prediction model, a tracking and/or localization model, an event and/or activity detection model, a scene detection model, etc.

In some cases, the wearable electronic device may incorporate an AI/ML model(s). The wearable electronic device can use the AI/ML model(s) to support, implement, facilitate, manage, coordinate, administer, control, configure, customize, provide, enhance, augment, and/or improve any of the capabilities of the wearable electronic device described herein, such as sensing/detection capabilities, prediction capabilities, alert/notification capabilities, and/or any other capabilities. The AI/ML model(s) can be adaptive and can learn and optimize model and/or device operations, settings, capabilities, parameters, etc. In some cases, such learning and optimization can occur as the wearable electronic device is used and/or the AI/ML model(s) is/are trained/updated. The AI/ML model(s) can learn patterns, behaviors, preferences, and/or parameters, and use the learned patterns, behaviors, preferences, and/or parameters to update, optimize, and/or customize one or more capabilities and/or settings of the wearable electronic device. The AI/ML model(s) can learn information (e.g., patterns, behaviors, preferences, parameters, etc.) and/or optimize settings and/or capabilities of the wearable electronic device based on training data, data provided to the AI/ML model(s), and/or data obtained (e.g., collected, aggregated, generated, interpolated, extrapolated, etc.) by the wearable electronic device.

The data can include, for example and without limitation, device data from the wearable electronic device or any component(s) thereof (e.g., device activity data, device performance data, device errors, device alerts, device communications data, hardware data, device settings, device event data, device parameters, device inputs and/or outputs, etc.), sensor data/inputs (e.g., motion data, proximity data, acoustic data, image data, fused sensor data, location data, environmental data, touch input data, altitude measurements, heading measurements, inertial measurements, pose or position information, impact sensor data, etc.), user inputs, software data (e.g., software activity and/or event data, software error logs, software statistics, software operations data, software inputs and/or outputs, software settings, synthetic data generated by software such as the AI/ML model(s), etc.), user data (e.g., user activity, user preferences, user inputs, user behavior data, user patterns, user profile data, user characteristics information, user historical data, etc.), usage data (e.g., user usage statistics and/or patterns, device usage statistics, etc.), ground truth data training data sets, and/or any other data. As noted above, in some cases, the sensor data/inputs can include environmental data. The environmental data can include, for example and without limitation, temperature measurements, humidity measurements, ambient light measurements and/or light intensity measurements, noise levels, atmospheric pressure measurements, airflow measurements, and/or any other environmental data.

The AI/ML model(s) can be trained to update, optimize, manage, modify, adapt, determine/select, and/or customize a configuration of the wearable electronic device, a configuration of the AI/ML model(s), a behavior of the wearable electronic device such as a behavior facilitated and/or implemented by the AI/ML model(s), model parameters, device parameters and/or settings, device capabilities, a device and/or model performance, device and/or software behaviors, etc. For example, the AI/ML model(s) can be trained with one or more datasets to achieve a particular performance, configuration, state, behavior, accuracy, adaptiveness, etc. In some cases, the AI/ML model(s) can be trained with data used to establish a baseline, optimized, learned, adaptive, desired, customized, and/or any particular sensing/ detection, recognition, prediction, alerting/notification, performance, system, and/or operating behavior(s) and/or setting(s). In some examples, the AI/ML model(s) can establish such behavior(s) and/or setting(s) across a number of environments, users, contexts, devices, device types, platforms, software environments, device configurations, use cases or applications, scenarios, conditions, and/or any other factors.

In some cases, the AI/ML model(s) can be updated, optimized/refined, and/or customized during a training phase and/or in real-time (or near real-time) using any of the data previously described, such as training data, device data, user data, activity/usage data, learned patterns, environmental data, inputs, event data, sensor data, and/or any other data. The AI/ML model(s) can use any information to influence, adapt, customize, select, configure, manage, determine, optimize, and/or implement a certain behavior(s) and/or configuration(s) of the wearable electronic device. For instance, the AI/ML model(s) can learn to use contextual data to influence, customize, adapt, select, configure, update, optimize, manage, and/or determine how certain operations are triggered (e.g., how alerts are triggered, how sensing operations are triggered, how operating modes are triggered, how thresholds are triggered, how detection and/or recognition operations are triggered, how communications with other devices are triggered, etc.), how a behavior of the wearable electronic device is triggered and/or configured (and/or what behavior is implemented when), and/or how certain thresholds, such as detection, output, alert, proximity, error, event, behavior, operating, and/or other thresholds are configured, adjusted, adapted, customized, etc. The contextual data can include, for example and without limitation, motion state data (e.g., speed, velocity, linear acceleration, directional movement and/or acceleration, trajectory, etc.), geolocation data (e.g., localization data such as location coordinates, an address, a location in three-dimensional space, etc.), ambient light levels and/or light intensity levels, sound characteristics (e.g., sound/noise levels, types of sounds, sound/noise patterns, voice characteristics, etc.), user commands (e.g., text commands, voice commands, gesture-based commands, etc.), user and/or device movement, environment information (e.g., moisture/humidity levels, pressure levels, temperature measurements, altitude levels, etc.), pose information (e.g., position information, orientation information, etc.), scene information, landscape information, etc.

The adaptive learning of the AI/ML model(s) may allow the wearable electronic device to distinguish between contextual nuances (e.g., environment-specific nuances, user-specific nuances, location-specific nuances, usage nuances, etc.). For example, the adaptive learning of the AI/ML model(s) of the wearable electronic device can allow the wearable electronic device to recognize (e.g., via the AI/ML model(s) of the wearable electronic device) that a transparent surface like a glass door may represent a threat (e.g., a threat of collision and associated damage, etc.) in one environment but may not represent a threat in another environment, that a certain sound (e.g., a crashing sound, a sound of breaks being applied, an impact sound, a motion sound, etc.) and/or moving object may represent a threat (e.g., in a real-life city environment) but may not represent a threat in another environment (e.g., a movie theater). The AI/ML model(s) can use such information to tailor, manage, control, select, implement, adapt, determine, enable, and/or configure a behavior and/or parameter of the wearable electronic device, such as an alert behavior, a detection behavior, a threshold parameter, etc. In some cases, the AI/ML model(s) may learn to and intelligently filter certain outputs (e.g., alerts, signals, etc.), operating results, thresholds, triggers, conditions, etc.

For example, the AI/ML model(s) may learn to identify and filter false positive alerts, sensing/detection results, triggering events, etc., in order to reduce false positives. To illustrate, the AI/ML model(s) can include intelligent and/or adaptive learning capabilities that allow the AI/ML model(s) (and thus the wearable electronic device) to detect, filter, and reduce false positive alerts and triggering events, and personalize the user experience over time (and/or in a particular scenario, context, condition, etc.).

The wearable electronic device may include a single AI/ML model, multiple AI/ML models, or an AI/ML model with multiple model (e.g., neural network) heads, branches, cores, components, etc. The AI/ML model(s) implemented by the wearable electronic device can include any type of AI/ML model(s). Moreover, the AI/ML model(s) implemented by the wearable electronic device may or may not depend on the type of device of the wearable electronic device, the use/application of the wearable electronic device, a device tier of the wearable electronic device (e.g., a premium or higher-cost tier versus a standard or lower-cost tier), the type of device use and/or capabilities, a desired performance, hardware resources of the wearable electronic device, and/or any other factors. Non-limiting examples of AI/ML models include CNN models, RNN models, LLM models, DBN models, AI/ML models with attention and/or generative capabilities (e.g., transformer models, autoencoder or VAE models, encoder-decoder models, encoder-only models, decoder-only models, GAN models, LSTM models, feed-forward neural network models, perceptrons, ANN models, and/or any other AI/ML models. An illustrative example of an AI/ML model that can be implemented by the wearable electronic device is illustrated in FIG. 8 and further described below with respect to FIG. 8.

The wearable electronic device can support implementations with adaptive learning (e.g., via one or more AI/ML models) as previously described. In some cases, the wearable electronic device can additionally or alternatively support pre-programmed implementations, such as pre-programmed or statically programmed behavior profiles, device parameters, settings, functionalities, etc. The adaptive learning and/or pre-programmed features enabled by the AI/ML model(s) can allow capabilities, processes, functions, settings, operations, and/or any other features described herein to be deployed across a wide range of device classes/types, use cases and/or applications, operational environments, contexts, scenarios, and/or any other conditions. In some examples, the adaptive learning and/or pre-programmed features of the wearable electronic device can allow the wearable electronic device to be used and/or optimized/customized for different users and/or applications.

In some examples, the wearable electronic device may operate based on pre-programmed movement patterns, pre-programmed user profiles, pre-programmed device profiles, pre-programmed parameters/variables, pre-programmed or static environmental profiles, pre-programmed thresholds, pre-programmed triggers, and/or any other pre-programmed/static features. For example, the wearable electronic device may have pre-programmed movement patterns, such as vehicle movement patterns, bicycle and/or motorcycle movement patterns, user movement patterns (e.g., user-specific movement patterns, group-specific movement patterns and/or movement patterns of groups of user characteristics such as age groups and/or physical attributes or size ranges, etc.), animal movement patterns (e.g., movement patterns of specific types of animals such as selected or designated animal types, movement patterns of animals within a certain size range(s), movement patterns of certain animals selected based on a location associated with the wearable electronic device such as animals that are more common to respective geographic areas where the wearable electronic device is located/used, etc.), movement patterns of one or more objects or types of objects (e.g., movement patterns of skateboards, drones, debris, sports balls, etc.), movement patterns configured for specific uses/applications of the wearable electronic device (e.g., sports or training applications, use cases involving certain activities such as hiking or sledding, safety and/or assistive technology applications, virtual and/or augmented reality applications, gaming applications, entertainment applications, etc.), and/or any other movement patterns. In some cases, the wearable electronic device may also have pre-programmed or fixed thresholds, such as detection and/or alert thresholds, and/or behavior parameters, such as alert parameters (e.g., vibration settings, audio alert settings, visual alert settings, etc.).

In some examples, the wearable electronic device may or may not be configured to suppress certain alerts, events, and/or operations. For example, the wearable electronic device can be configured to suppress alerts for static objects (e.g., walls, furniture, trees, etc.) by default, while allowing alerts for moving threats to be generated and allowing moving threats to be detected/recognized. The wearable electronic device may or may not allow any alert suppression settings to be modified (e.g., turned off, updated, customized, optimized, changed, etc.). In some examples, the wearable electronic device may include firmware-defined settings, parameters, and/or behaviors such as firmware-defined vibration settings, thresholds (e.g., proximity thresholds, motion thresholds, etc.), and/or alert behaviors corresponding to certain types of detected movement or movement patterns (e.g., movement from vehicles, bicycles, motorcycles, humans, animals, moving objects, etc.).

In some cases, the wearable electronic device can implement pre-programmed behavior/configuration profiles without real-time learning, such as real-time, adaptive AI/ML learning. The pre-programmed (e.g., statically defined) behavior/configuration profiles may allow the wearable electronic device to operate without AI/ML models and/or implement a more lightweight and/or lower-power operation (e.g., relative to adaptive AI/ML learning implementations) while still providing effective/accurate behaviors and functionalities, such as alerting functionalities. In some cases, the pre-programmed behavior/configuration profiles can be used in and/or may be more suitable for deployments of the wearable electronic device determined to have a lower need for real-time learning and/or where real-time learning is deemed unnecessary.

In some examples, the processes described herein (e.g., process 700 and/or other operations described throughout this disclosure) may be performed by a computing apparatus such as a wearable alert system 102 or 104. For instance, process 700 may be executed by the hardware components 210 of the wearable alert system 102 illustrated in FIG. 2 and/or the neural network 810 shown in FIG. 8. In another example, the process 700 may be implemented by a computing device having the computing architecture shown in FIG. 9. For example, a computing device with the structure of FIG. 9 may include one or more components of the wearable alert system 102 of FIG. 2 and be configured to carry out the sensing, proximity determination, and sensory alert operations described in FIG. 7.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 8 is a diagram illustrating an example architecture 800 of an example neural network 810, according to some examples of the present disclosure. The example architecture 800 of the neural network 810 can be used to implement any AI/ML model, algorithm, or neural network described herein and/or any components described herein that can include or implement an AI/ML model(s), algorithm(s), or neural network(s). For example, the neural network 810 can be used to implement an AI/ML model(s) of the wearable electronic device 102. In some examples, the neural network 810 can be used to implement a proximity and/or presence detection model, an alert system model or notification model, a recognition model, a classification model, a sensor data processing model, an audio and/or text command processing model, a large language model (LLM), a transformer model, an RNN model, an autoencoder model, a VAE model, a decoder model, an encoder model, an encoder-decoder model, a generative AI model, a GAN model, a CNN model, or any other AI/ML model.

The architecture 800 of the neural network 810 can include an input layer 820 that can be configured to receive and process data to generate one or more outputs. The architecture 800 of the neural network 810 can also include hidden layers 822A, 822B, through 822N. The hidden layers 822A, 822B, through 822N include "n" number of hidden layers, where "n" is an integer greater than or equal to one. The number of hidden layers can be made to include as many layers as needed for the given application. The architecture 800 of the neural network 810 can further include an output layer 821 that provides an output resulting from the processing performed by the hidden layers 822A, 822B, through 822N.

The neural network 810 is a multi-layer neural network of interconnected nodes. Each node can represent a piece of information. Information associated with the nodes is shared among the different layers, and each layer can retain information as information is processed. In some examples, the neural network 810 can include a feed-forward network, in which case there are no feedback connections where outputs of the neural network 810 are fed back into itself. In some cases, the neural network 810 can include a recurrent neural network, which can have loops that allow information to be carried across nodes while reading in input. In some cases, the neural network 810 can include an attention model that assigns weights or importance scores to different elements of any input sequence in order to selectively focus or pay attention to the most important parts of the input sequence and allow the neural network 810 to understand the relationships between different parts of the input.

Information can be exchanged between nodes through node-to-node interconnections between the various layers. Nodes of the input layer 820 can activate a set of nodes in the first hidden layer 822A. For example, as shown, each of the input nodes of the input layer 820 is connected to each of the nodes of the first hidden layer 822A. The nodes of the first hidden layer 822A can transform the information of each input node by applying activation functions to the input node information. The information derived from the transformation can then be passed to and can activate the nodes of the next hidden layer 822B, which can perform their own designated functions. Example functions include convolutional, up-sampling, data transformation, and/or any other suitable functions. The output of the hidden layer 822B can then activate nodes of the next hidden layer, and so on. The output of the last hidden layer 822N can activate one or more nodes of the output layer 821, at which an output is provided. In some cases, while nodes in the neural network 810 are shown as having multiple output lines, a node can have a single output and all lines shown as being output from a node represent the same output value.

In some cases, each node or interconnection between nodes can have a weight that is a set of parameters derived from the training of the neural network 810. Once the neural network 810 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network 810 to be adaptive to inputs and able to learn as more and more data is processed.

The neural network 810 can be pre-trained to process the features from the data in the input layer 820 using the different hidden layers 822A, 822B, through 822N in order to provide the output through the output layer 821. In some cases, the neural network 810 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 810 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total = \Sigma(\frac{1}{2}(target\text{-}output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 810 can perform a backward pass by determining which inputs (weights) most contributed to the loss of the network and can adjust the weights so that the loss decreases and is eventually minimized.

The neural network 810 can include any suitable deep network. One example neural network includes a transformer network, which can be used to implement a large language model, for example. Another example neural network includes a CNN, which includes an input layer and an output layer, with multiple hidden layers between the input and out layers. The hidden layers of a CNN include a series of convolutional, nonlinear, pooling (for downsampling), and fully connected layers. The neural network 810 can include any other deep network other than a transformer or CNN, such as an encoder-decoder network, an encoder-only network, a decoder-only network, a mixture of experts (MoE) network, a generative model network, an autoencoder, DBNs, RNNs, transformers, LLMs, GANs, perceptrons, neural network branches, neural network heads, among other models and/or model components. As understood by those of skill in the art, machine-learning based techniques can vary depending on the desired implementation. For example, AI/ML schemes can utilize one or more of the following, alone or in combination: hidden Markov models; RNNs; CNNs; deep learning; Bayesian symbolic methods; GANs; support vector machines; generative AI; image registration methods; sensor data processing methods; predictive methods; applicable rule-based systems; etc. Where regression algorithms are used, they may include but are not limited to a Stochastic Gradient Descent Regressor, a Passive Aggressive Regressor, etc.

AI/ML models, such as classification models, can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Moreover, in some cases, AI/ML models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 9:
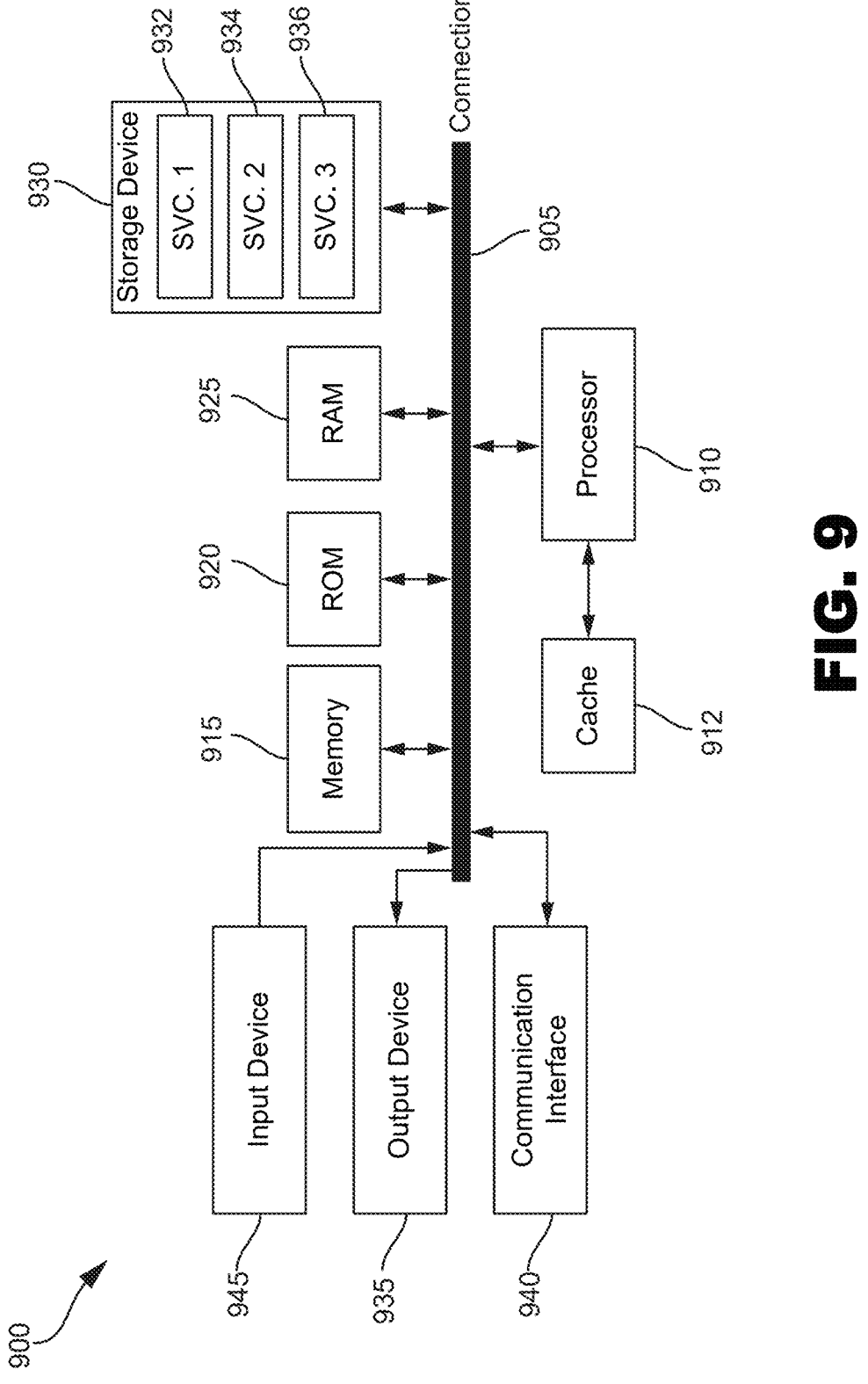
FIG. 9 is a block diagram illustrating an example of a computing system, in accordance with some examples of the present disclosure.

FIG. 9 is a diagram illustrating an example of a system for implementing certain aspects of the present technology. In particular, FIG. 9 illustrates an example computing system 900, which can be for example any computing device making up internal computing system, a remote computing system, or any component thereof in which the components of the system are in communication with each other using connection 905. For example, computing system 900 can be used to implement wearable alert system 102, wearable alert system 104, any of the computing devices 120, neural network 810, and/or any other system described herein. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data.

A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. An apparatus comprising: at least one memory; and one or more processors coupled to the at least one memory and configured to: obtain sensing data based on one or more wireless signals, the sensing data comprising at least one of a proximity measurement and a distance measurement; determine, based on the sensing data, a spatial relationship between a user associated with the apparatus and a source of the one or more wireless signals; determine whether the spatial relationship satisfies a proximity condition associated with a distance threshold; and based on a determination that the spatial relationship satisfies the proximity condition associated with the distance threshold, trigger a sensory alert via one or more output components.

Aspect 2. The apparatus of Aspect 1, wherein the source of the one or more wireless signals is a second apparatus, and wherein the spatial relationship between the user and the source of the one or more wireless signals is determined based on a corresponding spatial relationship between the apparatus and the second apparatus.

Aspect 3. The apparatus of any of Aspects 1 to 2, wherein determining the spatial relationship based on the one or more wireless signals comprises analyzing at least one of a time-of-flight of the one or more wireless signals, an angle-of-arrival of the one or more wireless signals, a received signal strength of the one or more wireless signals, and a characteristic of the one or more wireless signals.

Aspect 4. The apparatus of any of Aspects 1 to 3, wherein the distance threshold is dynamically adjusted based on at least one of a movement, a motion state, and an activity type of at least one of the apparatus and the user associated with the apparatus.

Aspect 5. The apparatus of any of Aspects 1 to 4, wherein the one or more output components comprises at least one of a vibration motor, a visual indicator, and an auditory output element, and wherein the sensory alert comprises at least one of a vibration pattern, a visual signal, and an audio cue.

Aspect 6. The apparatus of any of Aspects 1 to 5, wherein the apparatus is embedded in a headband, a hat, a helmet, an article of clothing, or a wearable structure comprising at least one of a textile, an adhesive patch, a stretchable mesh, or a garment-integrated circuit assembly.

Aspect 7. The apparatus of any of Aspects 1 to 6, wherein the one or more processors are further configured to: detect a motion state of the user associated with the apparatus based on sensor data from the apparatus; and adjust at least one of the proximity condition and the distance threshold based on the detected motion state.

Aspect 8. The apparatus of any of Aspects 1 to 7, wherein the one or more processors are further configured to: generate a directional sensory alert based on an estimated angle-of-arrival of the one or more wireless signals.

Aspect 9. The apparatus of any of Aspects 1 to 8, wherein the apparatus is constructed using one or more materials comprising at least one of silicone, rubber, silicone rubber, thermoplastic polyurethane (TPU), polycarbonate or a polycarbonate composite, a medical-grade polymer, a polydimethylsiloxane (PDMS), a waterproof membrane, polytetrafluorocthylene (cPTFE), a two-dimensional carbide or carbonitride, a flexible coated medical film tape, polyvinyl chloride (PVC), a flexible plastic, a flexible circuit, polypropylene, nylon, a woven fabric composite, and a material with an ingress protection (IP) rating above IPO.

Aspect 10. The apparatus of any of Aspects 1 to 9, wherein the one or more processors are further configured to: select a wireless signaling protocol from among a plurality of available protocols based on energy usage, signal quality, and an environmental condition; or filter at least one of the one or more wireless signals based on identifier information, wherein the identifier information corresponds to one or more designated devices, and wherein the sensing data corresponds to the filtered one or more wireless signals.

Aspect 11. The apparatus of any of Aspects 1 to 10, wherein the proximity condition and the sensory alert are based on a usage context, wherein the usage context comprises a sports training scenario, and an assistive navigation scenario.

Aspect 12. A method comprising: obtaining sensing data based on one or more wireless signals, the sensing data comprising at least one of a proximity measurement and a distance measurement; determining, based on the sensing data, a spatial relationship between a device associated with a user and a source of the one or more wireless signals; determining whether the spatial relationship satisfies a proximity condition associated with a distance threshold; and based on a determination that the spatial relationship satisfies the proximity condition associated with the distance threshold, triggering a sensory alert via one or more output components.

Aspect 13. The method of Aspect 12, wherein the source of the one or more wireless signals is a different device, and wherein the spatial relationship between the device and the source of the one or more wireless signals is determined based on a corresponding spatial relationship between the device and the different device.

Aspect 14. The method of any of Aspects 12 to 13, wherein determining the spatial relationship based on the one or more wireless signals comprises analyzing at least one of a time-of-flight of the one or more wireless signals, an angle-of-arrival of the one or more wireless signals, a received signal strength of the one or more wireless signals, and a characteristic of the one or more wireless signals.

Aspect 15. The method of any of Aspects 12 to 14, wherein the distance threshold is dynamically adjusted based on at least one of a movement, a motion state, and an activity type of at least one of the device and the user associated with the device.

Aspect 16. The method of any of Aspects 12 to 15, wherein the one or more output components comprises at least one of a vibration motor, a visual indicator, and an auditory output element, and wherein the sensory alert comprises at least one of a vibration pattern, a visual signal, and an audio cue.

Aspect 17. The method of any of Aspects 12 to 16, wherein the device is embedded in a headband, a hat, a helmet, an article of clothing, or a wearable structure comprising at least one of a textile, an adhesive patch, a stretchable mesh, or a garment-integrated circuit assembly.

Aspect 18. The method of any of Aspects 12 to 17, further comprising: detect a motion state of the user associated with the device based on sensor data from the device; and adjust at least one of the proximity condition and the distance threshold based on the detected motion state.

Aspect 19. The method of any of Aspects 12 to 18, further comprising: filter at least one of the one or more wireless signals based on identifier information, wherein the identifier information corresponds to one or more designated devices, and wherein the sensing data corresponds to the filtered one or more wireless signals.

Aspect 20. The method of any of Aspects 12 to 19, wherein the apparatus is constructed using one or more materials comprising at least one of silicone, rubber, silicone rubber, thermoplastic polyurethane (TPU), polycarbonate or a polycarbonate composite, a medical-grade polymer, a polydimethylsiloxane (PDMS), a waterproof membrane, polytetrafluoroethylene (ePTFE), a two-dimensional carbide or carbonitride, a flexible coated medical film tape, polyvinyl chloride (PVC), a flexible plastic, a flexible circuit, polypropylene, nylon, a woven fabric composite, and a material with an ingress protection (IP) rating above IPO.

Aspect 21. A non-transitory computer-readable medium having stored thereon instructions which, when executed by one or more processors, cause the one or more processors to perform a method according to any of Aspects 12 to 20.

Aspect 22. A system comprising means for performing a method according to any of Aspects 12 to 20.

What is claimed is:

1. A wearable electronic device comprising:
at least one memory; and
one or more processors coupled to the at least one memory and configured to:
  obtain sensor data from sensors of the wearable electronic device, the sensor data comprising a proximity measurement of a proximity sensor from the sensors, a motion measurement of an inertial sensor from the sensors, and at least one of an orientation measurement from the inertial sensor, a signal characteristic of one or more wireless signals associated with the sensor data, and a distance measurement of a distance sensor from the sensors;

determine, based on the sensor data, a spatial relationship between a sensed entity and the wearable electronic device, wherein the spatial relationship comprises a relative proximity and a relative motion between the sensed entity and the wearable electronic device, wherein the sensed entity comprises at least one of an entity detected or measured based on the sensor data, an entity within a path of the one or more wireless signals, and a source of the one or more wireless signals, wherein the sensed entity comprises a human or an object;

determine to change a power mode of the wearable electronic device based on a motion state of at least one of the wearable electronic device and the sensed entity, the motion state comprising at least one of the relative motion between the sensed entity and the wearable electronic device, the relative proximity between the sensed entity and the wearable electronic device, and one or more motion properties determined based on the sensor data;

change the power mode of the wearable electronic device from a first power mode to a second power mode comprising a higher power mode than the first power mode, wherein the second power mode causes the wearable electronic device to increase at least one of a sensor polling frequency of at least a portion of the sensors, a sampling rate of at least a portion of the sensors, sensing operations performed by at least a portion of the sensors, a period of active sensing implemented by at least a portion of the sensors, and an alert condition sensitivity, wherein increasing the alert condition sensitivity comprises reducing an alert condition threshold;

determine that an alert condition associated with a sensory alert is satisfied based on the spatial relationship between the sensed entity and the wearable electronic device, the alert condition comprising a proximity condition associated with a distance or proximity threshold and associated with at least one of a rate-of-closure threshold and a trajectory-based threshold; determine a customized sensory alert configuration for the sensory alert based on an alert response history associated with one or more sensory alerts generated by the wearable electronic device and further based on at least one of the relative proximity, the relative motion, the motion state, and a context, the customized sensory alert configuration comprising an alert modality, an alert frequency, an alert magnitude, and at least one of an alert directionality, an alert intensity, an alert duration, an alert pattern, and one or more additional alert modalities, the alert response history comprising one or more user actions detected by the wearable electronic device within a threshold period of time after the one or more sensory alerts generated by the wearable electronic device; and in response to determining that the alert condition is satisfied, generate, via one or more output components of the wearable electronic device, the sensory alert according to the customized sensory alert configuration.

2. The wearable electronic device of claim 1, wherein the sensed entity comprises the object and the object is an apparatus, and wherein the one or more motion properties comprise at least one of a motion pattern and a motion attribute of at least one of the apparatus and the wearable electronic device, and wherein the at least one of the motion pattern and motion attribute comprises at least one of a speed, a trajectory, an orientation, a velocity, a pattern of movement over at least a time period, a direction of movement, and a stationary property.

3. The wearable electronic device of claim 1, wherein determining the spatial relationship comprises analyzing at least one of a time-of-flight of the one or more wireless signals, an angle-of-arrival of the one or more wireless signals, a received signal strength of the one or more wireless signals, and a value associated with the one or more wireless signals, and wherein the one or more characteristics of the one or more wireless signals comprise at least one of the angle-of-arrival, the received signal strength, and the value associated with the one or more wireless signals.

4. The wearable electronic device of claim 1, wherein the motion state comprises at least one of a trajectory, an orientation, a position, a type of motion, a speed, a direction of movement, a velocity, an acceleration, a change in the direction of movement, a stationary or moving state, a shock or impact state, and a motion pattern.

5. The wearable electronic device of claim 1, wherein the context comprises at least one of ambient sound in an environment of the wearable electronic device, a sound level of the ambient sound, a type of sound in the environment, ambient light in the environment, a brightness or light intensity level in the environment, and a weather condition in the environment, and wherein determining the customized sensory alert configuration comprises determining the alert modality alert or whether to include the one or more additional alert modalities based on the at least one of the ambient sound, the sound level, the type of sound, the ambient light, the brightness or light intensity level, and the weather condition.

6. The wearable electronic device of claim 1, wherein the wearable electronic device comprises circuitry integrated into a garment, a headband, a hat, a vest, a belt, an armband, a wristband, a jacket, headgear, glasses, earbuds, a shirt or jersey, a footwear item, a helmet, an article of clothing, a textile, an adhesive patch, and a stretchable mesh, the one or more output components comprising at least one of a haptic output device, a light-emitting device, a speaker device, and a visual indicator, the sensory alert comprising at least one of a haptic alert, a visual alert, and an audio alert.

7. The wearable electronic device of claim 1, wherein the one or more processors are further configured to:
  based on the sensor data, detect the motion state comprising at least one of the relative motion between the sensed entity and the wearable electronic device, the relative proximity between the sensed entity and the wearable electronic device, and the one or more motion properties, wherein the one or more motion properties comprise at least one of a distance, a trajectory, and a rate-of-closure
  based on the motion state, adjust at least one of the alert condition, the proximity threshold, the rate-of-closure threshold, the trajectory-based threshold, and the distance threshold.

8. The wearable electronic device of claim 1, wherein the sensory alert comprises a directional sensory alert, and wherein a directionality of the directional sensory alert is determined based on an estimated angle-of-arrival of the one or more wireless signals.

9. The wearable electronic device of claim 1, wherein the wearable electronic device is constructed using at least one of flexible circuitry integrated into a garment, silicone, rubber, silicone rubber, thermoplastic polyurethane (TPU), polycarbonate or a polycarbonate composite, a medical-grade polymer, a polydimethylsiloxane (PDMS), a water-proof membrane, polytetrafluoroethylene (ePTFE), a two-dimensional carbide or carbonitride, a flexible coated medical film tape, polyvinyl chloride (PVC), a flexible plastic, a flexible circuit, polypropylene, nylon, a woven fabric composite, and a material with an ingress protection (IP) rating above IPO.

10. The wearable electronic device of claim 1, wherein the one or more processors are further configured to:
  detect a plurality of wireless signals via one or more sensor devices from the sensors, the plurality of wireless signals comprising the one or more wireless signals and one or more additional wireless signals, wherein the one or more wireless signals are originated by, reflected from, or received from the sensed entity, and wherein the one or more additional wireless signals are generated by, reflected from, or received from one or more designated devices; and
  filter the one or more additional wireless signals based on identifier information corresponding to the one or more designated devices, and wherein the sensor data at least partly corresponds to or is based from the plurality of wireless signals without the filtered one or more additional wireless signals.

11. The wearable electronic device of claim 1, wherein the one or more processors are further configured to:
  determine, based on additional sensor data obtained from the sensors, an activity context associated with at least one of the wearable electronic device and an environment of the wearable electronic device, the activity context indicating at least one of a period of inactivity of the wearable electronic device, a period of inactivity of one or more entities detected in the environment, less than a threshold amount of movement by the wearable electronic device for a threshold period of time, less than a threshold amount of motion by one or more moving entities detected in the environment, less than a threshold proximity or distance between the wearable electronic device and the one or more entities detected in the environment, less than a threshold proximity or distance between the wearable electronic device and the one or more moving entities detected in the environment, and a score determined based on the sensor data and representing less than a threshold threat of collision estimated between the wearable electronic device and at least one of the one or more entities and the one or more moving entities; and
  in response to determining that the activity context satisfies a lower-power mode triggering condition, change the power mode of the wearable electronic device from the second power mode to the first power mode, wherein the first power mode comprises a lower power mode than the second power mode and the first power mode causes the wearable electronic device to reduce at least one of the sensor polling frequency, the sampling rate, the sensing operations, the period of active sensing, and the alert condition sensitivity, wherein reducing the alert condition sensitivity comprises increasing an alert condition threshold.

12. A method comprising:
  obtaining, by a wearable electronic device, sensor data from sensors of the wearable electronic device, the sensor data comprising a proximity measurement of a proximity sensor from the sensors, a motion measurement of an inertial sensor from the sensors, and at least one of an orientation measurement from the inertial sensor, a signal characteristic of one or more wireless signals associated with the sensor data, and a distance measurement of a distance sensor from the sensors;

determining, by the wearable electronic device based on the sensor data, a spatial relationship between a sensed entity and the wearable electronic device, wherein the spatial relationship comprises a relative proximity and a relative motion between the sensed entity and the wearable electronic device, wherein the sensed entity comprises at least one of an entity detected or measured based on the sensor data, an entity within a path of the one or more wireless signals, and a source of the one or more wireless signals, wherein the sensed entity comprises a human or an object;

determining, by the wearable electronic device, to change a power mode of the wearable electronic device based on a motion state of at least one of the wearable electronic device and the sensed entity, the motion state comprising at least one of the relative motion between the sensed entity and the wearable electronic device, the relative proximity between the sensed entity and the wearable electronic device, and one or more motion properties determined based on the sensor data;

changing, by the wearable electronic device, the power mode of the wearable electronic device from a first power mode to a second power mode comprising a higher power mode than the first power mode, wherein the second power mode causes the wearable electronic device to increase at least one of a sensor polling frequency of at least a portion of the sensors, a sampling rate of at least a portion of the sensors, sensing operations performed by at least a portion of the sensors, a period of active sensing implemented by at least a portion of the sensors, and an alert condition sensitivity, wherein increasing the alert condition sensitivity comprises reducing an alert condition threshold;

determining, by the wearable electronic device, that an alert condition associated with a sensory alert is satisfied based on the spatial relationship between the sensed entity and the wearable electronic device, the alert condition being based on a distance threshold and at least one of a proximity threshold, a rate-of-closure threshold, and a trajectory-based threshold;

determining, by the wearable electronic device, a customized sensory alert configuration for the sensory alert based on an alert response history associated with one or more sensory alerts generated by the wearable electronic device and further based on at least one of the relative proximity, the relative motion, the motion state, and a context, the customized sensory alert configuration comprising an alert modality, an alert frequency, an alert magnitude, and at least one of an alert directionality, an alert intensity, an alert duration, an alert pattern, and one or more additional alert modalities, the alert response history comprising one or more user actions detected by the wearable electronic device within a threshold period of time after the one or more sensory alerts generated by the wearable electronic device; and in response to determining that the alert condition is satisfied, generating, via one or more output components of the wearable electronic device, the sensory alert according to the customized sensory alert configuration.

13. The method of claim 12, wherein the sensed entity comprises the object and the object is a device, and wherein the one or more motion properties comprise at least one of a motion pattern and a motion attribute of at least one of the device and the wearable electronic device, wherein the at least one of the motion pattern and motion attribute comprises at least one of a speed, a trajectory, an orientation, a velocity, a pattern of movement over at least a time period, a direction of movement, and a stationary property, wherein the context comprises at least one of ambient sound in an environment of the wearable electronic device, a sound level of the ambient sound, a type of sound in the environment, ambient light in the environment, a brightness or light intensity level in the environment, and a weather condition in the environment, and wherein determining the customized sensory alert configuration comprises determining the alert modality alert or whether to include the one or more additional alert modalities based on the at least one of the ambient sound, the sound level, the type of sound, the ambient light, the brightness or light intensity level, and the weather condition.

14. The method of claim 12, wherein determining the spatial relationship comprises analyzing at least one of a time-of-flight of the one or more wireless signals, an angle-of-arrival of the one or more wireless signals, a received signal strength of the one or more wireless signals, and a value associated with the one or more wireless signals, and wherein the one or more characteristics of the one or more wireless signals comprise at least one of the angle-of-arrival, the received signal strength, and the value associated with the one or more wireless signals.

15. The method of claim 12, wherein the one or more output components comprise a plurality of output components, and wherein the motion state between the sensed entity and the wearable electronic device comprises a first motion state, the method further comprising:

based on additional sensor data obtained from the sensors after the sensory alert is generated, determining a second motion state of at least one of the sensed entity and the wearable electronic device, the second motion state comprising at least one of a different relative proximity than the relative proximity associated with the first motion state, a different relative motion than the relative motion associated with the first motion state, a different speed of at least one of the sensed entity and the wearable electronic device than a corresponding speed associated with the first motion state, a different trajectory of at least one of the sensed entity and the wearable electronic device than a corresponding trajectory associated with the first motion state, and a different motion pattern of at least one of the sensed entity and the wearable electronic device than a motion pattern associated with the first motion state;

based a difference between the first motion state and the second motion state, determining a different customized sensory alert configuration comprising at least one of a different haptic alert vibration pattern than a haptic alert vibration pattern associated with the customized sensory alert configuration, a different haptic alert output location than a haptic alert output location associated with the customized sensory alert configuration, a different audio alert message than an audio alert message associated with the customized sensory alert configuration, a different audio alert volume than an audio alert volume associated with the customized sensory alert configuration, a different audio alert sound pattern than an audio alert sound pattern associated with the customized sensory alert configuration, a different visual alert than a visual alert associated with the customized sensory alert configuration, a different number of alert modalities than a number of alert modalities associated with the customized sensory alert configuration, and a different combination of alert modalities than a combination of alert modalities associated with the customized sensory alert configuration; and generating, via at least one of the plurality of output components, an additional sensory alert according to the different customized sensory alert configuration.

16. The method of claim 12, wherein the motion state comprises at least one of a trajectory, an orientation, a position, a type of motion, a speed, a direction of movement, a velocity, an acceleration, a change in the direction of movement, a stationary or moving state, a shock or impact state, and a motion pattern.

17. The method of claim 12, wherein the wearable electronic device comprises circuitry integrated into a garment, a headband, a hat, a vest, a belt, an armband, a wristband, a jacket, headgear, glasses, earbuds, a shirt or jersey, a footwear item, a helmet, an article of clothing, a textile, an adhesive patch, and a stretchable mesh, the one or more output components comprising at least one of a haptic output device, a light-emitting device, a speaker device, and a visual indicator, the sensory alert comprising at least one of a haptic alert, a visual alert, and an audio alert.

18. The method of claim 12, further comprising:
based on the sensor data, detecting the motion state comprising at least one of the relative motion between the sensed entity and the wearable electronic device, the relative proximity between the sensed entity and the wearable electronic device, and the one or more motion properties, wherein the one or more motion properties comprise at least one of a distance, a trajectory, and a rate-of-closure based on the motion state, adjusting at least one of the alert condition, the proximity threshold, the rate-of-closure threshold, the trajectory-based threshold, and the distance threshold.

19. The method of claim 12, further comprising:
detecting a plurality of wireless signals via one or more sensor devices from the sensors, the plurality of wireless signals comprising the one or more wireless signals and one or more additional wireless signals, wherein the one or more wireless signals are originated by, reflected from, or received from the sensed entity, and wherein the one or more additional wireless signals are generated by, reflected from, or received from one or more designated devices; and filtering the one or more additional wireless signals based on identifier information corresponding to the one or more designated devices, and wherein the sensor data at least partly corresponds to or is based from the plurality of wireless signals without the filtered one or more additional wireless signals.

20. A non-transitory computer-readable medium having stored thereon instructions which, when executed by one or more processors, cause the one or more processors to:
obtain sensor data from sensors of a wearable electronic device, the sensor data comprising a proximity measurement of a proximity sensor from the sensors, a motion measurement of an inertial sensor from the sensors, and at least one of an orientation measurement from the inertial sensor, a signal characteristic of one or more wireless signals associated with the sensor data, and a distance measurement of a distance sensor from the sensors;

determine, based on the sensor data, a spatial relationship between a sensed entity and the wearable electronic device, wherein the spatial relationship comprises a relative proximity and a relative motion between the sensed entity and the wearable electronic device, wherein the sensed entity comprises at least one of an entity detected or measured based on the sensor data, an entity within a path of the one or more wireless signals, and a source of the one or more wireless signals, wherein the sensed entity comprises a human or an object;

determine to change a power mode of the wearable electronic device based on a motion state of at least one of the wearable electronic device and the sensed entity, the motion state comprising at least one of the relative motion between the sensed entity and the wearable electronic device, the relative proximity between the sensed entity and the wearable electronic device, and one or more motion properties determined based on the sensor data;

change the power mode of the wearable electronic device from a first power mode to a second power mode comprising a higher power mode than the first power mode, wherein the second power mode causes the wearable electronic device to increase at least one of a sensor polling frequency of at least a portion of the sensors, a sampling rate of at least a portion of the sensors, sensing operations performed by at least a portion of the sensors, a period of active sensing implemented by at least a portion of the sensors, and an alert condition sensitivity, wherein increasing the alert condition sensitivity comprises reducing an alert condition threshold;

determine that an alert condition associated with a sensory alert is satisfied based on the spatial relationship between the sensed entity and the wearable electronic device, the alert condition being based on a distance threshold and at least one of a proximity threshold, a rate-of-closure threshold, and a trajectory-based threshold;

determine a customized sensory alert configuration for the sensory alert based on an alert response history associated with one or more sensory alerts generated by the wearable electronic device and further based on at least one of the relative proximity, the relative motion, the motion state, and a context, the customized sensory alert configuration comprising an alert modality, an alert frequency, an alert magnitude, and at least one of an alert directionality, an alert intensity, an alert duration, an alert pattern, and one or more additional alert modalities, the alert response history comprising one or more user actions detected by the wearable electronic device within a threshold period of time after the one or more sensory alerts generated by the wearable electronic device; and in response to determining that the alert condition is satisfied, generate, via one or more output components of the wearable electronic device, the sensory alert according to the customized sensory alert configuration.

* * * * *